(12) United States Patent
Lennstrom et al.

(10) Patent No.: US 9,699,127 B2
(45) Date of Patent: Jul. 4, 2017

(54) SYSTEM AND METHOD FOR SENDING, DELIVERY AND RECEIVING OF DIGITAL CONTENT

(71) Applicant: Open Text S.A., Luxembourg (LU)

(72) Inventors: Brian Lennstrom, Bothell, WA (US); Lyle E. Bush, Bellevue, WA (US)

(73) Assignee: Open Text SA ULC, Halifax (CA)

( * ) Notice: Subject to any disclaimer, the term of this patent is extended or adjusted under 35 U.S.C. 154(b) by 0 days.

(21) Appl. No.: 13/927,023

(22) Filed: Jun. 25, 2013

(65) Prior Publication Data

US 2013/0346522 A1  Dec. 26, 2013

Related U.S. Application Data

(60) Provisional application No. 61/664,435, filed on Jun. 26, 2012.

(51) Int. Cl.
*H04L 12/58* (2006.01)
*H04L 29/08* (2006.01)

(52) U.S. Cl.
CPC ............ *H04L 51/14* (2013.01); *H04L 51/066* (2013.01); *H04L 51/08* (2013.01); *H04L 67/2838* (2013.01); *H04L 67/2842* (2013.01); *H04L 51/36* (2013.01)

(58) Field of Classification Search
CPC ....... H04L 51/08; H04L 51/14; H04L 51/066; H04L 67/2838; H04L 67/2842; H04L 51/36; H04L 67/2838
USPC .......................................................... 709/206
See application file for complete search history.

(56) References Cited

U.S. PATENT DOCUMENTS

| | | | |
|---|---|---|---|
| 5,644,404 A | 7/1997 | Hashimoto et al. | |
| 5,754,640 A | 5/1998 | Sosnowski | |
| 5,761,284 A | 6/1998 | Ranalli et al. | |
| 5,862,202 A | 1/1999 | Bashoura et al. | |
| 5,999,601 A | 12/1999 | Wells et al. | |
| 6,020,980 A | 2/2000 | Freeman | |
| 6,058,169 A | 5/2000 | Bramnick et al. | |
| 6,259,538 B1 | 7/2001 | Amit | |
| 6,301,611 B1 | 10/2001 | Matsumoto | |
| 6,512,593 B1 | 1/2003 | Yashiki | |
| 6,539,077 B1 | 3/2003 | Ranalli et al. | |

(Continued)

FOREIGN PATENT DOCUMENTS

| | | |
|---|---|---|
| JP | 2003319128 | 11/2003 |
| WO | WO0160050 | 8/2001 |
| WO | WO03061270 | 7/2003 |

OTHER PUBLICATIONS

Notice of Allowance issued for U.S. Appl. No. 13/315,978, mailed Oct. 22, 2014, 7 pages.

(Continued)

*Primary Examiner* — Dustin Nguyen
*Assistant Examiner* — Javier O Guzman
(74) *Attorney, Agent, or Firm* — Sprinkle IP Law Group

(57) ABSTRACT

Embodiments of a content delivery system are disclosed herein. In particular, an embodiment of a content delivery system may receive content associated with a first destination identifier associated with a first delivery method, determine a second destination identifier and a second delivery method associated with the first delivery destination, and deliver the content to the second destination identifier according to the second delivery method.

19 Claims, 12 Drawing Sheets

(56) References Cited

U.S. PATENT DOCUMENTS

| | | |
|---|---|---|
| 6,603,569 B1 | 8/2003 | Johnson, Jr. et al. |
| 6,618,165 B1 | 9/2003 | Sehgal |
| 6,825,947 B1 | 11/2004 | Asai |
| 6,922,255 B1* | 7/2005 | Tomida ................ 358/1.15 |
| 7,057,752 B1 | 6/2006 | Klotz, Jr. |
| 7,324,223 B1 | 1/2008 | Mori |
| 7,480,065 B1 | 1/2009 | Trandal et al. |
| 7,492,473 B2 | 2/2009 | Ferlitsch et al. |
| 7,653,185 B2 | 1/2010 | Rebert et al. |
| 8,249,228 B2 | 8/2012 | Street, Jr. |
| 8,310,710 B2 | 11/2012 | Phillips et al. |
| 8,493,606 B2 | 7/2013 | Phillips et al. |
| 8,937,736 B2 | 1/2015 | Rebert et al. |
| 8,970,880 B2 | 3/2015 | Riedel et al. |
| 8,970,881 B1 | 3/2015 | Schwarz |
| 8,995,025 B2 | 3/2015 | Rebert |
| 9,544,469 B2 | 1/2017 | Rebert et al. |
| 9,596,381 B2 | 3/2017 | Rebert et al. |
| 2001/0005268 A1 | 6/2001 | Eguchi |
| 2001/0005864 A1* | 6/2001 | Mousseau ......... G06Q 10/107 |
| | | 719/318 |
| 2001/0027478 A1* | 10/2001 | Meier ................ H04L 51/14 |
| | | 709/206 |
| 2001/0056538 A1 | 12/2001 | Amano |
| 2002/0018245 A1* | 2/2002 | Saito et al. .............. 358/468 |
| 2002/0021791 A1 | 2/2002 | Heilmann |
| 2002/0026498 A1 | 2/2002 | Kim |
| 2002/0033961 A1 | 3/2002 | Murphy |
| 2002/0051146 A1* | 5/2002 | Tanimoto ................ 358/1.9 |
| 2002/0054371 A1 | 5/2002 | Tanimoto |
| 2002/0157028 A1 | 10/2002 | Koue et al. |
| 2003/0053444 A1* | 3/2003 | Swartz ............... H04L 12/58 |
| | | 370/352 |
| 2003/0086124 A1 | 5/2003 | Parry |
| 2003/0142801 A1 | 7/2003 | Pecht |
| 2004/0136513 A1 | 7/2004 | Chiu |
| 2005/0086240 A1 | 4/2005 | Richardson et al. |
| 2005/0094176 A1 | 5/2005 | Matsuishi |
| 2005/0108323 A1* | 5/2005 | Taylor .............. H04L 12/589 |
| | | 709/203 |
| 2005/0162706 A1 | 7/2005 | Eguchi |
| 2005/0190402 A1 | 9/2005 | Nakamura |
| 2005/0270558 A1* | 12/2005 | Konsella et al. ........ 358/1.15 |
| 2005/0275871 A1 | 12/2005 | Baird et al. |
| 2006/0227367 A1 | 10/2006 | Kitada |
| 2007/0130365 A1 | 6/2007 | Rebert et al. |
| 2007/0146802 A1 | 6/2007 | Ushida |
| 2007/0150242 A1 | 6/2007 | Kitada |
| 2007/0168557 A1 | 7/2007 | Henry |
| 2007/0297002 A1 | 12/2007 | Hase |
| 2008/0019519 A1 | 1/2008 | Su |
| 2008/0065477 A1 | 3/2008 | Korhonen |
| 2008/0155108 A1 | 6/2008 | Morris |
| 2009/0034015 A1 | 2/2009 | Mulligan |
| 2009/0067414 A1 | 3/2009 | Toscano et al. |
| 2009/0073499 A1 | 3/2009 | Glunz |
| 2009/0161168 A1 | 6/2009 | Miyamoto |
| 2009/0190159 A1 | 7/2009 | Toscano et al. |
| 2009/0222663 A1 | 9/2009 | Chow et al. |
| 2009/0316203 A1 | 12/2009 | Dukie |
| 2009/0323100 A1* | 12/2009 | Lee ................ H04N 1/00214 |
| | | 358/1.15 |
| 2010/0002260 A1 | 1/2010 | Naylor et al. |
| 2010/0007917 A1 | 1/2010 | Webster et al. |
| 2010/0039678 A1 | 2/2010 | Noel et al. |
| 2010/0067063 A1 | 3/2010 | Jang |
| 2010/0075673 A1 | 3/2010 | Colbert et al. |
| 2010/0085609 A1 | 4/2010 | Hong |
| 2010/0182651 A1 | 7/2010 | Rebert et al. |
| 2010/0208726 A1 | 8/2010 | Oliszewski et al. |
| 2010/0281016 A1 | 11/2010 | Weissman |
| 2010/0296121 A1 | 11/2010 | Shaheen, III et al. |
| 2011/0110366 A1 | 5/2011 | Moore et al. |
| 2011/0211218 A1 | 9/2011 | Gilmore |
| 2012/0143658 A1 | 6/2012 | Toscano |
| 2012/0257249 A1 | 10/2012 | Natarajan |
| 2012/0274988 A1 | 11/2012 | Bloomfield |
| 2012/0297471 A1 | 11/2012 | Smithson |
| 2013/0088741 A1 | 4/2013 | Murata et al. |
| 2013/0091042 A1* | 4/2013 | Shah et al. ............... 705/35 |
| 2013/0287189 A1* | 10/2013 | Cichielo et al. ...... 379/100.17 |
| 2013/0293933 A1 | 11/2013 | Rebert et al. |
| 2014/0204411 A1 | 7/2014 | Riedel et al. |
| 2014/0307294 A1 | 10/2014 | Rebert |
| 2014/0340717 A1 | 11/2014 | Meitappan |
| 2015/0085324 A1 | 3/2015 | Rebert |
| 2015/0138601 A1 | 5/2015 | Riedel et al. |
| 2015/0146256 A1 | 5/2015 | Schwarz |
| 2015/0181075 A1 | 6/2015 | Rebert |
| 2015/0319338 A1 | 11/2015 | Rebert |
| 2017/0070618 A1 | 3/2017 | Rebert et al. |

OTHER PUBLICATIONS

Notice of Allowance issued for U.S. Appl. No. 13/316,001, mailed Oct. 27, 2014, 6 pages.

Notice of Allowance issued for U.S. Appl. No. 13/316,001, mailed Aug. 28, 2014, 6 pages.

Notice of Allowance issued for U.S. Appl. No. 13/461,351, mailed Aug. 28, 2014, 4 pages.

Notice of Allowance issued for U.S. Appl. No. 13/315,978, mailed Jul. 14, 2014, 7 pages.

Notice of Allowance issued for U.S. Appl. No. 13/461,351, mailed Jul. 22, 2014, 5 pages.

Final Office Action issued for U.S. Appl. No. 13/485,140, mailed on Aug. 7, 2014, 18 pages.

Office Action issued for U.S. Appl. No. 14/606,519, mailed Mar. 9, 2015, 15 pages.

Office Action issued for U.S. Appl. No. 14/606,523, mailed Mar. 11, 2015, 11 pages.

Office Action issued for U.S. Appl. No. 14/556,958, mailed Mar. 30, 2015, 8 pages.

International Preliminary Report on Patentability (IPRP) issued for PCT Application No. PCT/EP2013/059026, mailed on Nov. 13, 2014, 7 pages.

Notice of Allowance issued in U.S. Appl. No. 13/485,140, mailed Nov. 18, 2014, 9 pages.

Partial Search Report issued for European Patent Application No. 13 173 845.2, mailed on Nov. 14, 2013, 5 pages.

Office Action issued for U.S. Appl. No. 13/315,978, mailed Dec. 16, 2013, 14 pages.

Notice of Allowance issued for U.S. Appl. No. 13/316,001, mailed Dec. 23, 2013, 9 pages.

Schneider, "Introduction to Multi-Tenant Architecture," Feb. 11, 2009, [retrieved on Dec. 8, 2010, from <<http:www.developer.com/design/article.php/3801931>> 4 pages.

"Multi-tenant Architecture," © 2009-2010 Zscaler, Inc., [retrieved on Dec. 8, 2010, from <<http://www.zscaler.com/multi-tenant.html>>] 2 pages.

Chong et al., "Architecture Strategies for Catching the Long Tail," Microsoft Corporation, Apr. 2006, [retrieved on Dec. 8, 2010, from <<http://msdn.microsoft.com/en-us/library/aa479069(printer).aspx>>, 20 pages.

"Cloud-based Networking—Why Multi-tenancy Matters," White Paper, © 2010 Pareto Networks™, 14 pages.

Notice of Allowance issued for U.S. Appl. No. 13/316,001, mailed Apr. 3, 2014, 6 pages.

Notice of Allowance issued for U.S. Appl. No. 13/315,978, mailed Apr. 7, 2014, 7 pages.

Extended Search Report issued for European Patent Application No. 13 173 845.2, mailed on Mar. 4, 2014, 9 pages.

International Search Report and Written Opinion issued for PCT Application No. PCT/EP2013/059026, completed on Jun. 21, 2013 and mailed on Jul. 2, 2013, 10 pages.

Notice of Allowance issued for U.S. Appl. No. 13/461,351, mailed Apr. 23, 2014, 6 pages.

(56) References Cited

OTHER PUBLICATIONS

Office Action issued in U.S. Appl. No. 13/485,140, mailed Feb. 24, 2014, 14 pages.
Notice of Allowance issued for U.S. Appl. No. 14/556,958, mailed Jul. 17, 2015, 6 pages.
Office Action issued for U.S. Appl. No. 14/606,519, mailed Sep. 8, 2015, 14 pages.
Office Action issued for U.S. Appl. No. 14/800,350, mailed Sep. 10, 2015, 8 pages.
Office Action issued for U.S. Appl. No. 14/606,523, mailed Oct. 19, 2015, 18 pages.
Notice of Allowance issued for U.S. Appl. No. 14/556,958, mailed Dec. 11, 2015, 7 pages.
Final Office Action issued for U.S. Appl. No. 14/606,519, mailed Dec. 16, 2015, 14 pages.
Notice of Allowance issued for U.S. Appl. No. 14/800,350, mailed Jan. 11, 2016, 8 pages.
Office Action issued for U.S. Appl. No. 14/612,969, mailed Feb. 29, 2016, 16 pages.
Notice of Allowance issued for U.S. Appl. No. 14/556,958, mailed Mar. 24, 2016, 6 pages.
Notice of Allowance issued for U.S. Appl. No. 14/606,523, mailed Apr. 8, 2016, 15 pages.
Notice of Allowance issued for U.S. Appl. No. 14/800,350, mailed Apr. 22, 2016, 3 pages.
Office Action for U.S. Appl. No. 14/606,519, mailed May 3, 2016, 14 pgs.
Notice of Allowance issued for U.S. Appl. No. 14/606,523, mailed Jul. 15, 2016, 6 pages.
Office Action issued for U.S. Appl. No. 14/612,969, mailed Aug. 2, 2016, 19 pages.
Notice of Allowance issued for U.S. Appl. No. 14/800,350, mailed Aug. 10, 2016, 3 pages.
Office action issued for U.S. Appl. No. 14/606,519, mailed Oct. 12, 2016, 15 pages.
Notice of Allowance issued for U.S. Appl. No. 14/556,958, mailed Nov. 7, 2016, 4 pages.
Notice of Allowance issued for U.S. Appl. No. 14/800,350, mailed Nov. 7, 2016, 4 pages.
Notice of Allowance issued for U.S. Appl. No. 14/606,523, mailed Nov. 16, 2016, 7 pages.
Office Action issued for U.S. Appl. No. 14/612,969, mailed Feb. 7, 2017, 16 pages.
Office Action issued for U.S. App. No. 14/612,969, mailed Feb. 28, 2017, 19 pages.
Office Action issued for U.S. Appl. No. 15/356,078, mailed Feb. 24, 2017, 10 pages.

\* cited by examiner

SYSTEM AND METHOD FOR SENDING, DELIVERY AND RECEIVING OF DIGITAL CONTENT

RELATED APPLICATIONS

This application claims a benefit of priority under 35 U.S.C. 119 to U.S. Provisional Patent Application Ser. No. 61/664,435, filed Jun. 26, 2012, entitled "SYSTEM AND METHOD FOR SENDING, DELIVERY AND RECEIVING OF DIGITAL CONTENT," by inventors Brian Lennstrom and Lyle Bush, which is incorporated herein in its entirety by reference.

TECHNICAL FIELD

This disclosure relates generally to digital content delivery in a network environment. More particularly, this disclosure relates to the transmission, delivery or reception of digital content through computer networks or telephone networks. Even more specifically, this disclosure relates to the secure transmission, delivery or reception of digital content over networks using distributed services.

BACKGROUND

With the increase of networked (both wired and wireless) and distributed computing environments (e.g., the Internet, mobile or cellular networks, office internets or intranets, etc.) the need to transfer digital content between computing devices has increased markedly. Commensurate with the increased need to transfer this digital content, the size of the data that it is desired to transfer has also increased. This combination of factors presents difficulties with respect to the sending, delivery and reception of such digital content.

One way of sending such digital content is using facsimile. A facsimile (fax) comprises a document in a digital image format. The document is associated with metadata that specifies a destination with respect to the publicly switched telephone network (PSTN). Thus, typically for at least a portion of the transmission, the document is transmitted over the PSTN. Faxing provides a secure, traceable and non-repudiable mechanism for content delivery and can be particularly useful in business environments.

Faxing, however, has limitations. For example, conventional fax machines can only transmit black and white files with limited resolution in a specific format such as the Tagged Image File Format (TIFF). In many cases, people wish to transmit digital content in other formats, including for example, .jpg or .pdf. Faxing systems may not allow the transmission or attachment of these types of digital content.

While digital content may currently be sent between users the methods for doing so do not meet the need for a secure, traceable or non-repudiable method for sending digital content as is currently desired. What is desired, then, are versatile systems and methods for the sending, delivery and reception of digital content.

SUMMARY

Embodiments of systems and methods for the sending, delivery and receiving of digital content are disclosed herein. In particular, certain embodiments include a sending connector that may be deployed at a user's site, and a content delivery system that may be deployed remotely from the user's site. The sending connector can be accessed at the user's site over a network in order to perform functions associated with sending digital content. The sending connector deployed at the user's site communicates with the remotely deployed content delivery system to send, obtain status on, or perform other functions associated with, the delivery of digital content.

In certain embodiments, the content delivery system may include an administration module by which recipients may register destination identifiers (such as, without limitation, email addresses, fax numbers, URLs, network locations, etc.) and a delivery method or delivery destination associated with the destination identifier. The content delivery system may thus receive digital content from a sender, where the sender intends delivery by a particular delivery method and where the sender used a particular destination identifier associated with the intended delivery method. The content delivery system can deliver the digital content to the recipient using an appropriate delivery method, or to an appropriate delivery destination (e.g., a delivery method or delivery destination specified by the recipient). Such a content delivery system may be agnostic to the format of such digital content, delivering such content without respect to the format of such digital content.

Thus, using embodiments of such a content delivery system, digital content may be delivered to a recipient in its original format using a delivery method or delivery destination desired by the recipient irrespective of the delivery method intended by the sender. Accordingly, such content may be immediately processed or utilized by the recipient, especially when the recipient includes a computing application or destination (e.g., SharePoint library, Oracle, SAP, etc.). Similarly, as such content is received in its original format it may be used substantially without modification by a consuming application or other user and thus may immediately be integrated into existing workflows of the recipient or may be used to initiate such workflows or initiate particular steps in a workflow.

Furthermore, in some cases, the content delivery system may provide metadata to a recipient regarding digital content intended for that recipient. This metadata may be provided in addition to, or in lieu of, the digital content itself. In such cases, the metadata of such digital content may be utilized to initiate such processing, workflows or steps regardless of whether such digital content is eventually delivered to the recipient or not.

Additionally, security of the sending and delivery of digital content may be increased by verifying destination data such as delivery methods or delivery destinations using a registration system, encrypting transmissions over the network (e.g., using Basic 256 or being X.509 compliant) and deleting digital content after the expiration of a certain time period. Thus, by implementing a content delivery system in a central locale such that digital content only passes through a single intermediary during delivery and ensuring that content is deleted from this central location after delivery, or after expiration of a time period, security may be enhanced. Traceability may also be implemented through the use of reporting features provided by embodiments of sending connectors or content delivery systems as disclosed herein.

Moreover, as embodiments here may be usefully utilized by computing systems or users to send digital content and may deliver such digital content to both computing systems and users, embodiments of these content delivery systems may be used to deliver digital content in a user to user context, a system to user context, a user to system context or a system to system context. Thus, embodiments as described may be usefully employed, and integrated, with on premise applications.

In one embodiment, a method for delivering content may include receiving content associated with a first destination identifier associated with a first delivery method, determining a second destination identifier and a second delivery method associated with the first delivery destination and delivering the content to the second destination identifier according to the second delivery method.

In some embodiments, the sender module and the forwarder module are in a cloud based computing environment and the content is received at the sender module from a sending connector at a sending device. The sending connector may, for example, be a plug-in of an application.

As used herein throughout, cloud based computing refers to utilization of a network of distributed servers. In some embodiments, cloud computing is further defined by a network of distributed servers under the control of an organization on behalf of a set of users and/or clients who may access one or more of a set of software and hardware services executing on the servers remotely. In some instances still, the organization is an external organization independent of the users and/or clients.

In a particular embodiment, a remote content access module may be configured to allow a user to access the content at a location and wherein delivering content comprises providing the location from which the content may be accessed and sending the location to the second destination identifier. The second destination identifier may be the same as the first destination identifier or the second delivery method may be the same as the first delivery method.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 7 depicts one embodiment of an interface.

FIG. 8 depicts one embodiment of an interface.

DETAILED DESCRIPTION

Figure 1:
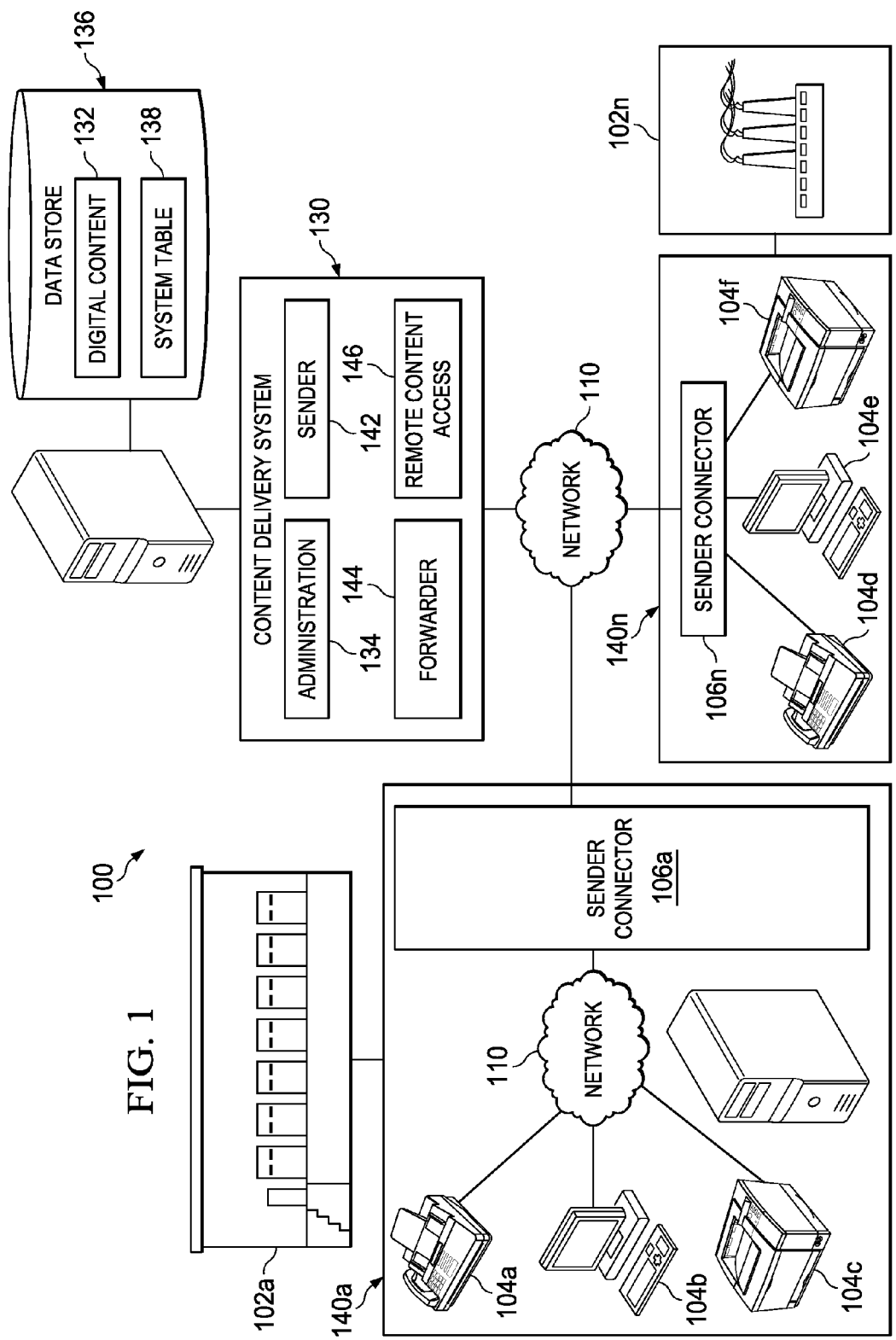
FIG. 1 depicts one embodiment of an architecture for a content delivery system.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments of the present invention can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In certain embodiments, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, or any other programming or scripting code. Other software/hardware/network architectures may be used. For example, the functions of embodiments may be implemented on one computer or shared or distributed among two or more computers across a network. In one embodiment, the functions of embodiments may be distributed in the network. Communications between computers implementing embodiments of the invention can be accomplished using any electronic, optical, ratio frequency signals, or other suitable methods and tools of communication in compliance with network protocols.

Communications between computers implementing embodiments can be accomplished using any electronic, optical, radio frequency signals, or other suitable methods and tools of communication in compliance with known network protocols. It will be understood for purposes of this disclosure that a service or module is one or more computer devices, configured (e.g., by a computer process or hardware) to perform one or more functions. A service may present one or more interfaces which can be utilized to access these functions. Such interfaces include APIs, interfaces presented for a web services, web pages, remote procedure calls, remote method invocation, etc.

Before discussing specific embodiments a brief overview of the context of the disclosure may be helpful. With the increase of networked (both wired and wireless) and distributed computing environments (e.g., the Internet, mobile or cellular networks, office internets or intranets, etc.) the need to transfer digital content between computing devices has increased markedly. Commensurate with the increased need to transfer this digital content, the size of the data that it is desired to transfer has also increased. This combination of factors, among others, presents difficulties with respect to the sending, delivery and reception of such digital content.

One way of sending such digital content is using facsimile. A facsimile (fax) comprises a document in a digital image format. The document is associated with metadata that specifies a destination with respect to the publicly switched telephone network (PSTN). Thus, typically for at least a portion of the transmission, the document is transmitted over the PSTN. Faxing provides a secure, traceable and non-repudiable mechanism for content delivery and can be particularly useful in business environments.

Faxing, however, has limitations. For example, conventional fax machines can only transmit black and white files with limited resolution in a specific format such as the Tagged Image File Format (TIFF). Further, the transmission speed can be very slow compared to today's Internet based standards. Not surprisingly, in recent years traditional faxing technology has faced increasing competition from Internet Protocol (IP) network (e.g., Internet, LANs, WANs, intranets, extranets, etc.) based alternatives (generally referred to as Internet faxing).

For example, instead of standalone fax machines, fax servers may be utilized in enterprise network environments. Typically, a fax server is a server computer having the necessary fax software and hardware to receive and send faxes over IP networks. Using fax servers may reduce the cost of transmission since there is no telephone connection charge when sending a fax over the Internet.

Additionally, some faxing solutions may be problematic as they include the need to access fax modems, routers or the PSTN (e.g., telephone lines) at the user's physical location. Increasingly, however, in most other areas of communication, including telephony itself, the trend has been toward use of the IP network based protocols (e.g., SMTP, FTP, VoIP, etc.). Accordingly, many traditional fax users no longer wish to maintain telephone lines or other access to the PSTN. It would therefore be desirable to give these users the ability to continue sending and receiving faxes without having to maintain local access to the PSTN.

Moreover, and importantly, in many cases fax documents are transmitted in a particular format (e.g., TIFF). In many cases, people wish to transmit digital content in other formats, including for example, .jpg or .pdf. Faxing systems may not allow the transmission or attachment of these types of digital content.

Digital content may also be transmitted using a wide variety of methods that utilize a computer based network (referred to hereinafter as a network) such as the Internet. While these network-based methods for the sending, delivery and reception of digital content are somewhat versatile, they are not without drawbacks. One challenge is that the Internet carries a vast range of information resources and services over a hodge-podge of protocols. For example, a user may send an email over the Internet, upload a file to a network site, and make a phone call over the Internet. The email may be sent via the Simple Mail transfer Protocol (SMTP), the file may be uploaded via the File Transfer Protocol (FTP), and the phone call may be conducted using the Voice over Internet Protocol (VoIP). Many of these existing network protocols do not meet the secure, traceable and non-repudiable needs of today's businesses. For example, the email (along with any attachment) as well as the file sent over the Internet unencrypted can be vulnerable to interception.

Thus, what is desired are systems and methods for the sending, delivery and reception of digital content that provide at least some of the secure, traceable and non-repudiable features of faxing with the versatility of network based methods for the sending, delivery and reception of digital content.

To that end, attention is now directed toward the embodiments of systems and methods for the sending, delivery and receiving of digital content disclosed herein. In particular, certain embodiments include a sending connector that may be deployed at a user's site, and a content delivery system that may be deployed remotely from the user's site. The sending connector can be accessed at the user's site in order to perform functions associated with sending digital content or obtaining status on digital content that was sent. The sending connector deployed at the user's site communicates with the remotely deployed content delivery system to send, obtain status on, or perform other functions associated with, the delivery of digital content.

The content delivery system may include an administration module by which recipients may register destination identifiers (such as, without limitation, email addresses, fax numbers, URLs, network locations, etc.) and a delivery method or delivery destination associated with the destination identifier. The content delivery system may thus receive digital content from a sender, where the sender intends delivery by a particular delivery method and where the sender used a particular destination identifier associated with the intended delivery method. The content delivery system can deliver the digital content to the recipient using an appropriate delivery method or to an appropriate delivery destination (e.g., a delivery method or delivery destination specified by the recipient, which may, or may not, be the same as the delivery destination of delivery method used by the sender). Such a content delivery system may be agnostic to the format of such digital content, delivering such content without respect to the format of such digital content.

Thus, using embodiments of such a content delivery system, digital content may be delivered to a recipient in its original format using a delivery method or delivery destination desired by the recipient irrespective of the delivery method intended by the sender. Accordingly, such content may be immediately processed or utilized by the recipient, including in cases where the recipient includes a computing application or destination (e.g., SharePoint library, Oracle, SAP, etc.). Similarly, as such content is received in its original format it may immediately integrated into existing workflows of the recipient or may be used to initiate such workflows or initiate particular steps in a workflow.

Furthermore, in some cases, the content delivery system may provide metadata to the recipient regarding digital content. This metadata may be provided in addition to, or in lieu of, the digital content itself. In such cases, the metadata of such digital content may be utilized to initiate such processing, workflows or steps regardless of whether such digital content is eventually delivered to the recipient or not.

Additionally, security of the sending and delivery of digital content may be increased by verifying destination data such as delivery methods or delivery destinations using a registration system, encrypting transmissions over the network (e.g., using Basic 256 or being X.509 compliant) and deleting digital content after the expiration of a certain time period. Thus, by implementing a content delivery system in a central locale such that digital content only passes through a single intermediary during delivery and ensuring that content is deleted from this central location after delivery, or after expiration of a time period, security may be enhanced. Traceability may also be implemented through the use of reporting features provided by embodiments of sending connectors or content delivery systems as disclosed herein.

Moreover, as embodiments here may be usefully utilized by computing systems or users to send digital content and may deliver such digital content to both computing systems and users; embodiments of these content delivery systems may be used to deliver digital content in a user to user context, a system (e.g., application) to user context, a user to system context or a system to system context.

Turning now to FIG. 1, one embodiment of an architecture for digital content delivery is depicted. Digital content delivery architecture 100 includes content sender systems 140 (e.g., one or more computing devices including mobile computing devices such as laptops, smartphones, personal data assistants, etc.) and content delivery system 130 (including data store 136) communicating over network 110 which may be, for example, the Internet, an internet, an intranet, a LAN a WAN, an IP based network, etc. These communications may be accomplished according to one or more protocols such as, for example, HTTP or SOAP and in one or more formats such as, for example, XML or HTML and may be encrypted using for example a public private key pair, Basic 256, adherence to the X.509 standard, etc.

Sending connectors 106 are installed or otherwise executed at a site or device where users wish to send digital content. Users in such an architecture 100 may be companies, individual users, or any other entity wishing to send digital content. Accordingly, sending connector 106 may be one or more computing devices or one or more computer processes executing on one or more computer devices utilized by such users to send digital content or may be a process executing in conjunction with another computer process, such as a plug-in to an application or a browser plug-in, a program executing in conjunction with a web page (e.g., an applet), etc.

Sending connector 106 may provide an interface such as an API, library, or other hardware or software interface through which digital content to send may be received from a client 104 of the sending connector 106. These clients 104 may include an email client (e.g., Outlook), SharePoint, an Oracle application, an SAP application, Lotus Notes, a fax machine, a web page loaded in a browser, a connector to SAP, an enterprise resource planning (ERP) system, etc.

In one embodiment, for example, the sending connector 106 may be a plug-in for use with an application such that when digital content is sent using the application (e.g., an email with an attachment sent utilizing an email application) the communication including the digital content may be received by the sending connector 106.

In another embodiment, the sending connector 106 may be a process such as an applet, executing in conjunction with a web page loaded in a browser, such that digital content may be sent using the web page and the digital content may be received by the sending connector 106. In one particular embodiment, such a web page may be a web page that tracks a conversation between one or more senders or recipients of content, such that communications and digital content sent between the senders and recipients may be tracked and presented over multiple communications. For example, such a web site or web page may be provided by content delivery system 130 such that when a browser at sending system 140 accesses the web page, a module (e.g., such as an applet) may be executed by the browser in conjunction with accessing the web page. This applet may be configured as sending connector 106 such that a user interacting with the web may provide digital content to the sending connector 106.

In any event, once sending connector 106 receives digital content to be sent, the sending connector 106 may communicate with content delivery system 130 over network 110 to send such digital content.

Content delivery system 130 includes administration module 134. Administration module 134 is configured to provide an interface by which users who wish to receive digital content may provide destination data. Such destination data may include, for example, a destination identifier such as an email address, a telephone number, a URL, an internet protocol (IP) address, an identifier for a SharePoint repository, or any other type of identifier that may be used (e.g., by senders) to specify a location to which digital content it to be sent.

Additionally, the destination data may include a delivery method or delivery destination associated with the destination identifier. For example, in association with a destination identifier the user may specify a network based delivery method; a delivery method associated with a particular program such as SecureDocs by OpenText; a delivery method such as email and an associated delivery destination such as an email address; a delivery method of an application such as SharePoint or Oracle and a delivery destination such as a URL or other network location associated with a module associated with the application of the delivery method; a delivery method of fax over PSTN and an associated telephone number as a delivery destination; a delivery method of point to point delivery (P2P) and provide a network location associated with a destination where such a location is associated with a fax server, etc.

The destination data, including a destination identifier and associated delivery method or delivery destination, may be stored in system table 138 in data store 136. Thus, the system table 138 may comprise a set of registered destination identifiers and associated destination data. It will be noted here that users who wish to receive digital content may specify multiple destination identifiers and the same or different destination data associated with these multiple destination identifiers. Administration module 134 may also present an interface by which users of content delivery system 130 may obtain or view statistics on digital content sent or received such as data usage, status on delivery, etc.

Content delivery system 130 also includes a sender module 142, forwarder module 144 and remote content access module 146. Sender module 142 is configured to receive digital content (e.g., from a sending connector 106) associated with a destination identifier and store such digital content 132 in the data store 136 in association with the destination identifier. Forwarder module 144 is configured to retrieve digital content 132 from the data store 136 and deliver the digital content. Such delivery may be based on the presence, or contents, of destination data in system table 138 associated with the destination identifier.

Forwarder module 144 may be configured to deliver digital content to multiple different receiving entities or may be associated with a specific receiving entity (in which case there may be multiple forwarder modules 144). Additionally, it will be realized that while the forwarder module 144 has been depicted in the content delivery system 130 in this embodiment, in other embodiments such a forwarder 144 may reside at the site of a receiving entity.

Accordingly, when a user in architecture 100 wishes to send digital content he may utilize a client 104 at the user's site to send the digital content using a destination identifier. In one embodiment, for example, an interface may be presented by the client 104 which allows the user to specify that he would like digital content to be delivered using the content delivery system 130 or the client 104 may be a web browser displaying a page allowing a user to send digital content using the sender connector 106 (which may be being executed by the browser), etc.

The digital content and the destination identifier may thus be received by the sender connector 106. The sender connector 106 may then send the destination identifier to the sender module 142 (e.g., using an interface provided by the sender module 142). The sender module 142 may authenticate the destination identifier by accessing the system table 138 to determine if the destination identifier has been registered by a user. Additionally, in some embodiments, the sender module 142 may determine if the sender has an entitlement to send the digital content (e.g., if the sender has an account, if the sender is allowed to use a specified sending or delivery method, if the sender can send the desired amount of data, etc.) by checking an account associated with the sender or sender connector 106.

If the sending of digital content by the sender to the destination identifier is authorized, a transmission identifier such as a token or a globally unique identifier (GUID) or the like may be provided to the sending connector 106 (e.g., by sender module 142). The sending connector 106 may transmit the digital content to the sender module 142 using this transmission identifier. In one embodiment, this digital content may be transmitted from the sender connector 106 in a set of chunks. Each of these chunks may comprise a portion of the digital content. Moreover, the sending connector 106 may transmit metadata associated with the digital content. This metadata may comprise an XML file that includes data on the digital content such as size, file type, or other types of data.

When the sender module 142 receives this digital content, the digital content (and associated metadata if received) is stored in the data store 136 in association with the transmission identifier and the destination identifier. Forwarder module 144 can then be notified that there is digital content 132 in data store 136. The forwarder module 144 may utilize the destination identifier associated with the digital content 132 to determine the delivery method or delivery destination associated with the destination identifier. The forwarder module 144 will deliver the digital content based on the delivery method or delivery destination associated with the destination identifier or the presence of data pertaining to such a delivery method or delivery destination.

For example, if there is no delivery method or delivery destination associated with the destination identifier present, an error may be returned to the sending connector 106 by forwarder module 144 and the digital content not delivered by the forwarder module 144. Alternatively, if there is no delivery method or delivery destination present the digital content may be delivered to the destination identifier using a delivery method corresponding to the destination identifier (e.g., if the destination identifier is an email address the digital content may be sent in an email to the email address; if the destination identifier is a telephone number the digital content may be faxed to the telephone number, etc.).

In still another embodiment, if there is no delivery method or delivery destination present a notification may be sent to the destination identifier with a notification that content is available through the remote content access module 146 and a method of accessing remote content access module 146 (e.g., when the destination identifier is an email address with no associated delivery method or delivery destination, forwarder module 144 may send an email to the destination identifier including a URL link associated with the remote content accesses module 146 and an identifier for the digital content, etc.). A user associated with the recipient may then access the remote content access module 146 to retrieve such content.

If, however, there is a delivery method or delivery destination associated with the destination identifier present, in one embodiment, delivery of the digital content may comprise sending the digital content to the delivery destination using the delivery method. This may entail sending the digital content to a URL, for example, associated with a receiving application, sending the digital content to a destination telephone number over the PSTN (e.g., using a fax server or fax service), sending an encrypted email with the digital content to the destination identifier if it is an email address, sending the content to a URL associated with the recipient's site, etc.

In one particular embodiment, the delivery method associated with a destination identifier may specify that the digital content is to be accessed through remote content access module 146. In such embodiments, forwarder 144 may make the digital content 132 available for access by remote content access module 146.

Remote content access module 146 may provide an interface (e.g., a web page or other interface accessible over network 110) through which users may access digital content 132 stored in data store 136. Thus, a recipient may access the remote content access module 146 and provide an identifier associated with digital content. The recipient may be notified that content is available through the remote content access module 146, for example, by an email including a URL link associated with the remote content accesses module 146 and an identifier for the digital content.

When the user clicks on such a link a browser at the recipient's site may access the remote content access module 146.

An interface may be presented by the remote content access module 146 that allows the recipient to access and download the digital content 132 associated with the identifier from the data store 136. In some embodiments, the user may be authenticated by the remote content access module 146 before being allowed to access the digital content. This access may be accomplished used brokered authentication, for example, using a security token service (STS). Verification of a recipient's credentials may also be verified using a 2-step verification process, by which credentials may be validated through a separate communication channel such as a mobile phone, etc.

While it should be understood from a review of the above description that embodiments as disclosed may be implemented using a wide variety of architectures and hardware or software systems; that a content delivery system and the modules thereof may be one or multiple systems that may or may not be distributed; that all of the modules presented herein may or may not be one or multiple services (e.g., web services or the like) with one or more interfaces; and that these one or more services may be implemented and accessed in a variety of manners, it will be useful here to describe a particular embodiment in more detail.

For a variety of reasons, including reducing hardware, software and support requirements, it may be desirable to have a content delivery system remote from a user's site. However, embodiments of the systems and methods disclosed herein may have many users and thus may entail the registration of many destination identifiers, the implementation of complex forwarders for particular delivery methods, the provisioning of a large number of locations on the network or the ability to provide multiple simultaneous accesses, etc. Additionally, as users of such a content delivery system may be geographically distributed it is desirable to maximize user's access to the content delivery system to reduce downtime and allow substantially simultaneous access from multiple users to the content delivery system.

Therefore, in one embodiment, an entity implementing embodiments of the systems and method disclosed herein may implement modules associated with a content delivery system in a cloud based computing environment by deploying services associated with a content delivery system using in a cloud. By deploying the modules of the content delivery system in the cloud as services or other cloud based applications (collectively services), such services can utilize the storage or other functionality provided by the cloud provider while achieving increased security, accessibility or reliability. In particular, deployment of such modules in a cloud based computing environment may facilitate the reception, storage or delivery of content with respect to certain geographic regions which may be desirable based on customer location, customer desire, regulations or for a wide variety of other reasons.

Figure 2:
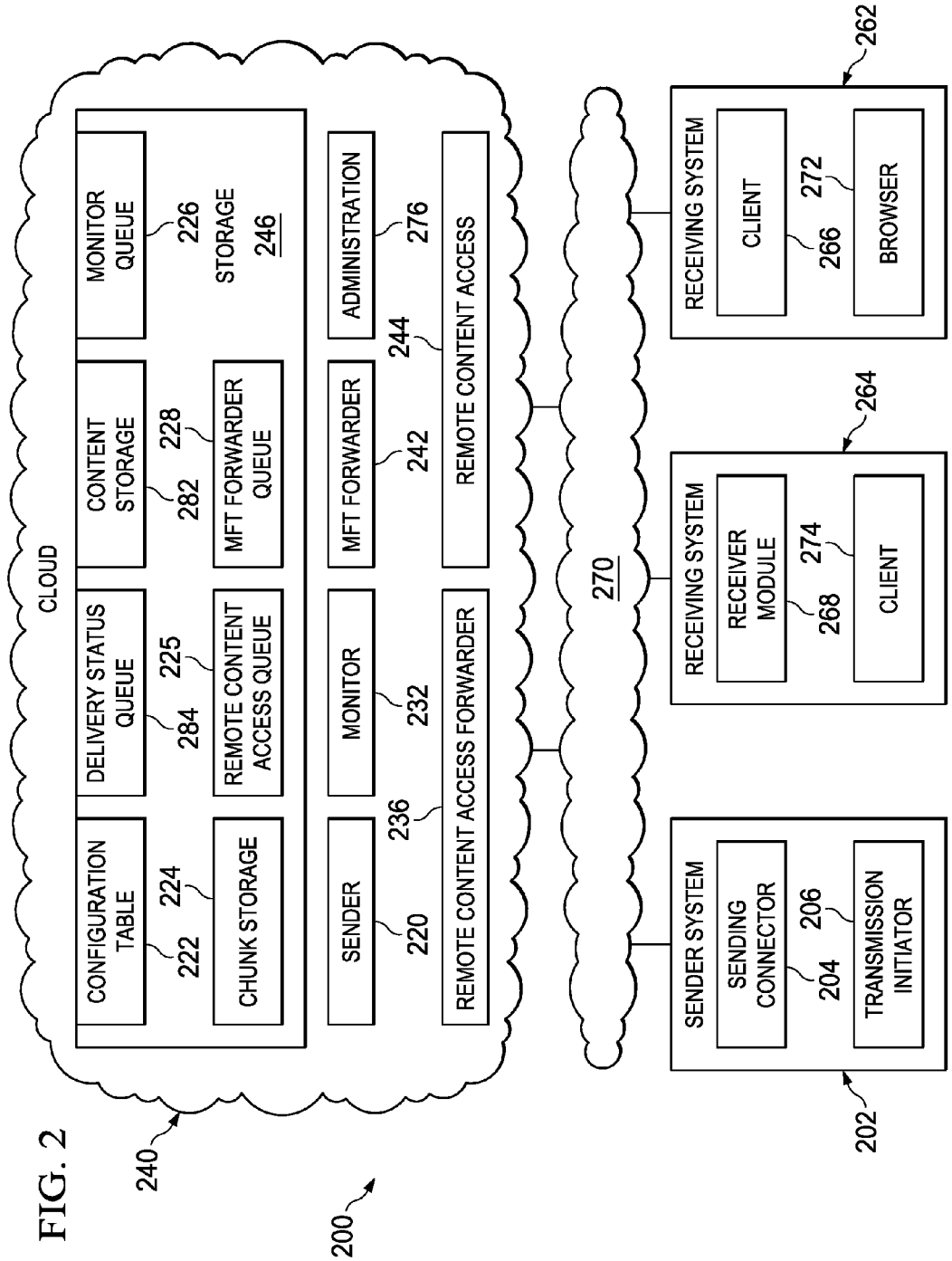
FIG. 2 depicts one embodiment of an architecture for a content delivery system.

With that in mind, turning now to FIG. 2, one embodiment of an architecture of a content delivery architecture where services associated with a content delivery system are deployed in a cloud based computing environment is depicted. Content delivery architecture 200 includes a network 270 over which the systems and modules communicate, including sending system 202, receiving systems 262, 264, and sender module 220, Managed File Transfer (MFT) forwarder module 242 and remote content access module 244 deployed in cloud 240 may communicate. The content delivery system in such an architecture 200 may comprise the sending connector 204 deployed at the sending system 202 and modules deployed in the cloud 240.

Sending connector 204 is provided at a sending system 202 and may have an associated identifier (i.e., the sending connector identifier). Sending systems 202 may include computing devices having a processor for executing instruction such as, for example, personal computers, laptops, mobile computer devices, smartphones, personal data assistants, etc. Sending connector 204 at the sending system 202 may communicate with one or more transmission initiators 206 who wish to send digital content. These transmission initiators 206 may be devices, application programs or other type client of the sending connector 204 associated with business processes or individuals at the sending site, for example Outlook, a web service, an Oracle application, an SAP application, SharePoint, Lotus Notes, a fax server, etc.

In one embodiment, for example, a transmission initiator 206 may be a web page on a browser executing on the sender system 202. In one particular embodiment, such a web page may be a web page that tracks a conversation between one or more senders or recipients of content, such that communications and digital content sent between the senders and recipients may be tracked and presented over multiple communications Accordingly, in certain embodiments the sending connector 204 may be a library (e.g., a .NET library or .c library or other type of library) or other type of plug-in or application that may be utilized in conjunction with these clients. In another embodiment, the sending connector 204 may be part of a web page (e.g., an applet, plug-in, ActiveX program, etc.) that is executing on a browser, where the browser may be rendering a web page that serves as transmission initiator 206. Such a web page may be provided, for example, by sender module 220 (or another module) associated with the content delivery system. Thus, a web site or web page may be provided by content delivery system such that when a browser at sending system 202 accesses the web page, a module (e.g., such as an applet) may be executed by the browser in conjunction with accessing the web page. This applet may be configured as sending connector 204 such that a user interacting with the web may provide digital content to the sending connector 204.

The sending connector 204 is configured to receive or otherwise obtain digital content and an associated destination identifier from the transmission initiator 206. The obtaining of digital content and destination identifier may occur explicitly when a user or program provides the digital content and destination identifier to the sending connector 204. For example, when a user interacts with an interface to indicate that he desires the digital content to be delivered using the content delivery system. The sending connector 204 may also obtain the digital content and destination identifier without express user involvement such as when a client (e.g., Outlook or other email client) sends an email with digital content and the email is intercepted by the sending connector 204 or when the transmission initiator 206 is a web page and the user utilizes the web page to send digital content.

The sending connector 204 is configured to send the destination identifier and digital content to the sender module 220 in the cloud and return a delivery status associated with the sending of the digital content to the transmission initiator 206 which initiated the transmission. Additionally, the sending connector 204 may be configured to instruct a transmission initiator 206 or client associated with transmission initiator 206 to perform actions in association with the sending of the content (e.g., to send an email or the like).

Receiving system 262 may have a browser 272 and one or more client applications 266 that may be used for notification or accessing digital content, such as Outlook, SharePoint, Oracle, SAP, or another type of application. Thus, it will be noted here that receiving of digital content using embodiments of the content delivery system presented herein may be accomplished without a receiving system 262 having any modules or other applications specifically associated with the content delivery system (e.g., without having a sending connector 204 at the receiving system).

Alternatively, a receiving system 264 may include a receiving module 268 associated with the content delivery system. Such a receiving module 264 may be configured to receive digital content from MFT forwarder module 242 and provide the digital content to a client 274 at the receiving system, such as SharePoint (e.g., a SharePoint library or repository), Oracle, SAP, or another type of application. Such a receiver module 268 may provide a location on the network (e.g., a URL or the like) and an associated interface where digital content can be sent. This URL may be specified, for example, as a delivery destination.

It will be noted here, that while receiver module 268 has, in this embodiment, been depicted separately from sending connector 204, in other embodiments the functions of receiver module 268 and sending connector 204 may be incorporated into a single module. Similarly, it will be noted that while sending systems and receiving systems have been depicted separately, in many instances a sender of digital content may also desire to be a receiver of digital content. Accordingly, in some embodiments a sender system may be the same as, or used in association with, a receiver system and that such systems may have a sender and receiver module (or a single module, or multiple distributed modules, that include the functionality of both the sender module and the receiver module). Other configurations may also be possible and are fully contemplated herein.

Still referring to FIG. 2, cloud 240 is a cloud based computing platform. A cloud may, for example, by a network of distributed servers or the like. In one embodiment, such a cloud based computing platform may be, for example, Microsoft Windows Azure. Content delivery services associated with the content delivery system that are deployed in the cloud 240 include sender 220, administration 276, managed file transfer (MFT) forwarder 242 and remote content access 244. These services may have one or more interfaces that may be accessed over network 270 using, for example, web pages, a web services interface based on hypertext transfer protocol (HTTP), Simplified Object Access Protocol (SOAP), or other types of network protocols or interfaces.

The cloud 240 may provide certain services that may be utilized by the deployed content delivery services, including for example the Microsoft Windows Azure Storage services such as table storage, queue storage, blob storage, etc. This storage may be used during operation of the deployed service and may store various configuration information associated with the services. Other services (not depicted) provided by the cloud 240 may also be utilized (e.g., in the case of Microsoft Windows Azure Platform: Web Role, Worker Role, VM Role, Access Control, Content Delivery Network, Caching, etc., other services in other cloud based computing platforms may also be utilized).

Administration module 276 may allow an administrator associated with sending system 202 to generally manage accounts associated with sending system 202 such as specifying one or more users, who they can send digital content, what delivery methods a user may utilize, etc. Additionally, the administration module 276 is configured to provide an interface by which a user (e.g., an individual user, an administrator, etc.) may register a destination identifier and provide destination data associated with the registered destination identifier or otherwise manage an account related to the content delivery system. The destination data may include a delivery method or delivery destination associated with the destination identifier. For example, in association with a destination identifier the user may specify a delivery method associated with remote access delivery; may specify a delivery method such as email and an associated delivery destination such as an email address; may specify a delivery method of an application such as SharePoint or Oracle and a delivery destination such as a URL or other network location associated with a module (e.g., receiver module 268) associated with that application; may specify fax over PSTN and an associated telephone number as a delivery destination; may specify point to point delivery (P2P) and provide a network location associated with a destination where such a location is associated with a fax server, etc. The administration module 276 may store the destination data in configuration table 222 in storage 246 provided by cloud 240.

Additionally, in some embodiments, as it may be desired to encrypt transmissions, the user may utilize administration module 276 to supply a public key that is part of a public/private key pair that may be used as part of a public/private key encryption mechanism (such as, for example, X.509 or the like).

When a transmission initiator desires to send digital content the digital content and an associated destination identifier is received at sending connector 204. As has been noted above, in some embodiments the sending connector 204 may be a plug-in or other module that operates with a transmission initiator 206 such that the digital content may be intercepted unobtrusively with respect to the operation of the transmission initiator 206 while in other embodiments the sending connector 204 may be executing as part of a web page being accessed by a user at sending system 202. The sender connector 204 may send the destination identifier to the sender module 220, for example, as part of a request to send digital content to the destination identifier.

Sender module 220 is configured to verify the received destination identifier by determining if the destination identifier is in configuration table 222. If the destination identifier is not in the configuration table 222 the sender module 220 may return an error to the sender connector 204. If the destination identifier is in the configuration table 222 the sender module 220 may return a token or other transmission permission or identifier (collectively referred to herein as a transmission identifier) such as a GUID to the sender connector 204.

In one embodiment, the sender module 220 may also be configured to check entitlements, including for example, permissions or account information associated with the sending system 202 or an associated delivery destination. If the entitlements indicate that the sending system 202, user, etc. does not have permission to send digital content the sender module may return an error to the sender connector 204 where the error may include a notification of why the request could not be completed.

If an error or other indication of denial is returned to the sending connector 204 the sending connector 204 may indicate an error or offer alternative options to the transmission initiator 206. If a token or other transmission permission or identifier is received at the sending connector 204 the sending connector 204 may transmit the digital content and associated metadata to sender module 220. The metadata may comprise, for example, an XML file indicating the size, type, author, date, or other data associated with the digital content.

In one embodiment, the sending connector 204 may transmit the digital content in one or more chunks to the sender module 220. The size of these chunks may be configurable or may be determined based on a wide variety of criteria (e.g., protocol, bandwidth availability, size of digital content, etc.) and may be static or may change dynamically during the transmission. For example, the digital content may be separated into chunks of 16 kb, 32 kb, 64 kb or 128 kb for transmission. Additionally, if encryption is being utilized the chunks may be encrypted using, for example, a public/private key pair associated with a public key received from sender module 220. A checksum can also be calculated by the sending connector 204 for each chunk being transmitted.

After the transmission of each chunk, the sending connector 204 may verify the status of the transmission of that chunk. In one embodiment, when a transmitted chunk is received by sender module 220, the sender module 220 may calculate the checksum for the received chunk and return the checksum to the sending connector 204. The sending connector 204 may compare the received checksum to the checksum calculated for the chunk before the chunk was transmitted to verify the transmission of that chunk. If the transmission of a chunk cannot be verified, an action may be taken. This action may include reporting the error to the transmission initiator 206.

Additionally, after the last chunk of the digital content has been sent to the location, the delivery of the digital content may be verified as well. This verification may be accomplished by sender connector 204 querying sender module 220 at regular intervals for the status and providing a token or other transmission permission or identifier (e.g., as received from the sender module 220) associated with the digital content. The sender module 220 may obtain the status of the job from delivery status queue 284 using the provided token or other transmission permission or identifier and return the status in response to this request. If the delivery cannot be verified an action may be taken. This action may include reporting the error to the transmission initiator 206.

Sender module 220 is thus configured to receive the chunks of the digital content associated with the destination identifier transmitted from the sending connector 204 and metadata associated with the digital content. The sender module 220 stores the received chunks in chunk storage 224 in association with the transmission identifier, stores the metadata in association with the transmission identifier and may create an entry in the delivery status queue 284 associated with the transmission identifier along with an initial status. To ensure security, it may be the case that all digital content stored in chunk storage 224 may have a time to live (or expiration date) such that they are deleted after a certain period of time (e.g., 30 days, 60 days, 90 days, etc.) even if the delivery of such content is never confirmed or never actually takes place. Moreover, chunk storage 224 may, in some embodiments, be distributed across geographic regions such that received chunks may be stored in a desired geographic region based on a wide variety of criteria, such as customer location, customer desire, rules and regulations, etc.

Additionally, sender module 220 accesses configuration table 222 to determine destination data associated with the received destination identifier, including for example the delivery method or delivery destination associated with the destination identifier. The sender module 220 is configured to place a transmission job in monitor queue 226. This transmission job may comprise the transmission identifier (e.g., sent to sending connector 204) which is also associated with chunks of digital content in chunk storage 224 and allows identification of those chunks. Additionally, the transmission identifier may allow identification of the metadata associated with the digital content which may be stored in storage 246. Data associated with the delivery method or the delivery destination or which allows determination of the delivery method or the delivery destination may also be stored in association with the transmission job in monitor queue 226.

Monitor module 232 is configured to check monitor queue 226 (or be notified when a transmission job is pending or placed in monitor queue 226) and obtain a transmission job from monitor queue 226. Based on the metadata, the delivery method, the delivery destination or other data associated with the transmission job, the monitor module 232 may send the transmission job to a queue associated with an appropriate forwarder. Almost any queuing algorithm desired may be utilized to determine the priority of transmission jobs in monitor queue 226.

In one embodiment, if the metadata, the delivery method, or the delivery destination associated with the obtained transmission job indicate that the digital content associated with that transmission job is to be delivered using the remote content access module 244, the transmission job may be placed in remote content access queue 225 while if the metadata, the delivery method or delivery destination indicate that the digital content is to be sent to a delivery destination the transmission job may be placed in MFT forwarder queue 228.

Each of the MFT forwarder 242 and remote content access forwarder 236 are configured to check their respective associated queues (MFT forwarder queue 228 and remote content access queue 225), or be notified when a transmission job is pending in their respective queue, obtain the transmission job from their respective queue.

When MFT forwarder 242 obtains a transmission job from MFT forwarder queue 228 it may access the chunks of digital content associated with the transmission job (e.g., using the transmission identifier associate with the transmission job) in chunk storage 224, assemble the digital content from the obtained chunks and store the digital content in the content storage 282 in association with the transmission identifier. Similarly to chunk storage 224, content storage 282 may, in some embodiments, be distributed across geographic regions such that received chunks may be stored in a desired geographic region based on a wide variety of criteria, such as customer location, customer desire, rules and regulations, etc.

MFT forwarder 242 may then send the assembled digital content to the receiver module 268 associated with the delivery method or the destination identifier. Alternatively, the delivery method associated with the obtained transmission job may indicate that only metadata on the digital content is desired. In such cases the MFT forwarder 242 may obtain metadata associated with the digital content associated with the transmission job and deliver such metadata to the receiver module 268 associated with the delivery method or the destination identifier.

After delivering the digital content (or metadata), MFT forwarder module 242 may place a delivery status confirmation on the delivery status queue 284 in association with the transmission job and delete the digital content from storage 246 (this deletion may entail the deletion of the digital content associated with the transmission identifier from content storage 282 or the deletion of digital content from anywhere in storage 246, such as chunks of the digital storage from chunk storage 224). To ensure security, it may be the case that all digital content stored in content storage 282 (or storage 246 generally) may have a time to live (or expiration date) such that they are deleted after a certain period of time (e.g., 30 days, 60 days, 90 days, etc.) even if the delivery of such digital content is never confirmed or never actually takes place.

Receiver module 268 at receiving system 264 thus receives the digital content from MFT forwarder 242 and may then provide this received digital content (or received metadata) to client 274 at the receiving system 264.

Similarly, when remote content access forwarder 236 obtains a transmission job from remote content access queue 225 it may access the chunks of digital content associated with the transmission identifier of the transmission job in chunk storage 224, assemble the digital content from the obtained chunks and store the digital content in content storage 282 in association with the transmission identifier. The area of content storage 282 where the digital content is stored by remote content access forwarder 236 may be accessible through, or utilized by, remote content access module 244. Additionally, remote content access forwarder 236 may assign permissions to that digital content based on the destination identifier associated with the transmission job such that the digital content is accessible (or only accessible) through remote content access module 244 to a user with the correct credentials.

After storing the digital content in the content storage 282 and assigning permissions, the remote content access forwarder 236 may place a delivery status confirmation on the delivery status queue 284 in association with the transmission job. Again, to ensure security, it may be the case that all digital content stored in content storage 282 (or storage 246 generally) may have a time to live (or expiration date) such that they are deleted after a certain period of time (e.g., 30 days, 60 days, 90 days, etc.) even if such content is never accessed using remote content access module 244 as described below.

Remote content access module 244 may provide a website or other interface through which documents can be viewed, downloaded or otherwise accessed. Thus, a user may access the remote content access module 244 through, for example, a browser 272 at receiving system 262 and identify digital content which it is desired to access. Using the permissions associated with the identified digital content, the remote content access module 244 may authenticate the user. This authentication may be done using, for example, a Security Token Service (STS). If the user is authenticated they may be allowed to access the digital content in the content storage 282. In one embodiment, remote content access module 244 may be similar to SecureDocs by OpenText Corporation and may be a website using ASP.Net and the model view control (MVC) framework.

As digital content is not delivered directly to a user at receiving system 262 such users or other recipients (e.g., applications) may not necessarily be aware when such content is available, nor may they have a method to identify such digital content to remote content access module 244. Thus, in some embodiments, a notification associated with such digital content may be provided to a recipient at the receiving system 262. This notification may be delivered through a client 266. This client 266 may be the same type of client as was used to initiate the transmission of the digital content at the sender system 202 (e.g., a sending connector) and may provide a way to identify the digital content to the remote content access module 244. Thus, in certain embodiments a notification may be provided using the delivery method intended by the sender while the digital content itself may be delivered using that delivery method or another delivery method altogether.

For example, in cases where the destination identifier denotes a URL a push notification with an identifier for the content may be sent to the URL to identify that content is available. This digital content may be obtained, for example, by the client 266, using an API and the provided identifier and the digital content received in response to this request provided to a recipient (e.g., an application using client 266 as a plug-in, etc.).

In another embodiment, in cases where the destination identifier associated with a transmission job is an email address an email may be sent to the destination identifier associated with the transmission job, where the email includes a link with a URL that includes the website provided by the remote content access module 244 and identifies the digital content associated with the transmission job. Thus, when a user of receiving system 262 receives such an email he may click on the link included in the email. The HTTP request with the URL may then be sent to the remote content access module 244 where the URL identifies the digital content. The website provided by the remote content access module 244 may then be brought up in the browser 272 at the receiving system 262 and the user allowed to access the digital content. Such an email may be sent, by example by the sending connector 204 (e.g., using the transmission initiator 206 in the case where the transmission initiator 206 is an email client such as Outlook) or may be sent by the remote content access module 244 itself.

More specifically, in one embodiment, if the transmission initiator 206 is an email client, the user may compose an email with digital content and a destination identifier (e.g., an email address). The sending connector 204 may receive this email (e.g., because the user indicated that he wishes to send the digital content using the content delivery system or because all emails having attachments are routed through the sending connector 204, etc.). The sender connector 204 may transmit the destination identifier to the sender module 220, for example, as part of a request to send digital content to the destination identifier.

When a transmission identifier is received from the sender module 220 in response to a request to send digital content, the transmission initiator 206 may modify the originally received email to create a notification email by removing the digital content and inserting a message with a URL associated with the remote content access module 244 and including the transmission identifier received from the sender module 220. The notification email can then be sent to the destination identifier provided by the user. The delivery of the content using the content delivery system may progress substantially as described above.

When the receiving user receives the notification email, this user may then bring up the website provided by the remote content access module 244 at the receiving system 262 by clicking the link in the notification email and the user will be allowed to access the digital content associated with the transmission identifier in content storage 282 as described.

Thus, a content delivery system may be utilized to deliver digital content using an appropriate delivery method or to an appropriate delivery destination without respect either to the format of such digital content or the method by which the content was originally sent or the method of delivery intended by the sender of such content.

FIGS. 3A-3E depict one embodiment of a method employed by embodiments of a content delivery system to send or deliver digital content. At step 310 digital content may be received. This digital content may be received along with an associated destination identifier indicating where the sender desires the digital to be sent. For example, this digital content may be received from a plug-in associated with a SAP, Oracle, SharePoint, Office 365, Lotus Notes, etc. application and associated with a network location or URL. In one embodiment, a plug-in may be utilized to intercept digital content at a certain point in a work flow involving such an application, where that point in the workflow is associated with a particular destination identifier.

Alternatively, a user may use an email client such as Outlook to create an email with an attachment where the email specifies an address (e.g., an email address, SMTP address, etc.) as the destination identifier. A plug-in may provide an interface by which the user may choose to send the email an in a secure manner or the email may be intercepted by the plug-in without any action from the user. A user may also desire to send digital content as a fax, in such cases, the digital content may be provided to a fax server (e.g., such as RightFax by OpenText Corporation) along with a destination identifier of a phone number. Another method by which content may be received is through a web site. Such a web site may be configured to allow a user to select content to be sent using the content delivery system and provide a destination identifier to which the content is to be sent.

At step 320 then, the digital content and the destination identifier specified by the sender (e.g., by the application or the user who sent the content) may be sent to a centralized portion of the content delivery system. For example, this portion of the content delivery system may be distributed among many computing devices or reside in a cloud based computing system, etc. When the digital content and associated destination identifier is received, it can be determined at steps 330 and 340 if the destination identifier is registered.

In one embodiment, a user have registered such a destination identifier and provided destination data associated with the registered destination identifier. The destination data may include a delivery method or delivery destination associated with the destination identifier. For example, in association with a destination identifier a user such as a customer or administrator may specify a delivery method associated with remote access delivery; may specify a delivery method such as email and an associated delivery destination such as an email address; may specify a delivery method of an application such as SharePoint or Oracle and a delivery destination such as a URL or other network location associated with a module associated with that application; may specify fax over PSTN and an associated telephone number as a delivery destination; may specify point to point delivery (P2P) and provide a network location associated with a destination where such a location is associated with a fax server, etc. Accordingly, at steps 330 and 340 it can be determined if the received destination identifier has been previously registered and, if so, the corresponding delivery method or delivery destination associated with the registered destination identifier.

In certain embodiments, it can also be determined at steps 330 and 340, if the sender or recipient associated with the received destination identifier has a valid entitlement to send or receive data respectively.

If the destination identifier is not registered (or does not have a valid entitlement) the sender may be given an error message at step 350. Additionally, the sender may be presented with the option of sending the digital content via an email message.

Alternatively, at step 352, if the destination identifier is not registered the digital content may be sent to the destination identifier using a delivery method corresponding to the destination identifier (e.g., if the destination identifier is an email address the digital content may be sent in an email to the email address; if the destination identifier is a telephone number the digital content may be faxed to the telephone number, etc.). In another embodiment, if there is no delivery method or delivery destination registered a notification may be sent to the destination identifier (e.g., using a method corresponding with the destination identifier) with a notification that content is available a method of accessing the digital content.

Figure 3A:
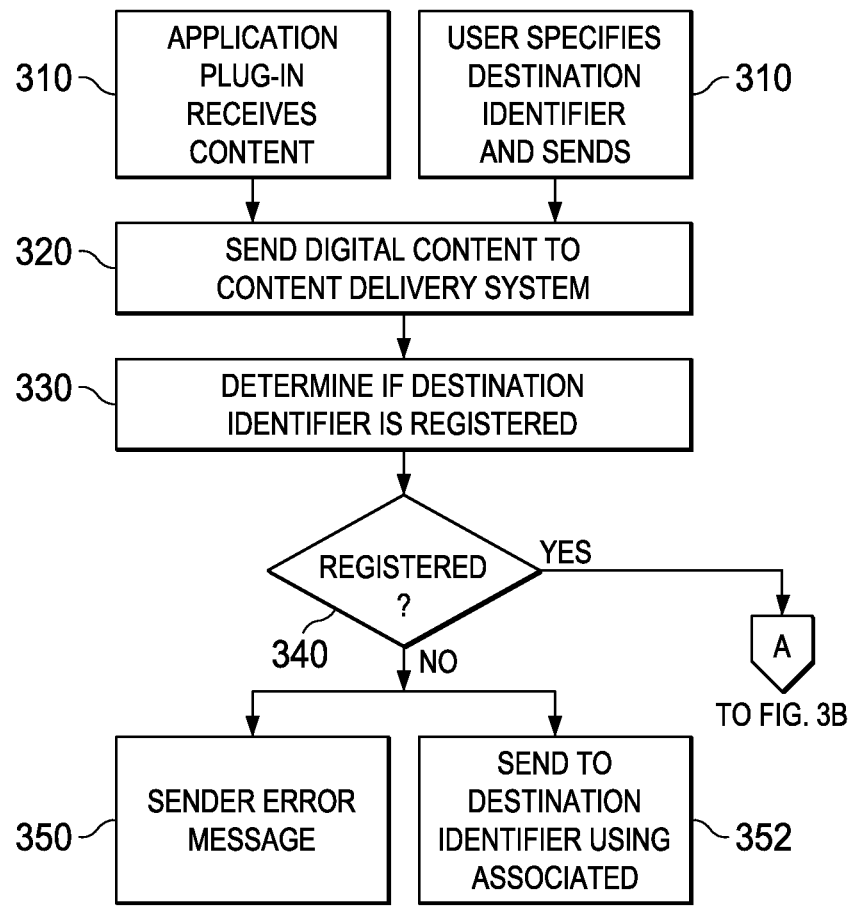
FIGS. 3A-3E depict one embodiment or a method for sending digital content.
Figure 3B:
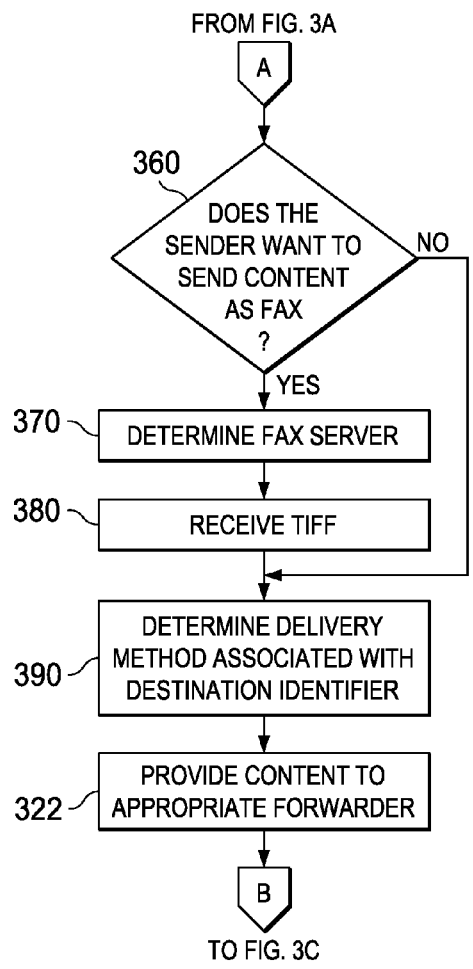

Now referring to FIG. 3B, if the destination identifier is registered it can be determined if fax was the sender's intended delivery method at step 360. This can be determined, for example, by the plug-in from which the digital content was received, an indication of the user with respect to the sending interface, the type of the destination identifier (e.g., telephone number), etc. If fax is the sender's intended method of sending the digital content, a fax server associated with the sender may be determined at step 370 (e.g., using the sender's identity). This fax server may be a fax server local to the sender or may be a hosted fax server. The digital content can then be sent to the fax server associated with the sender which converts the digital content to TIFF. The digital content in TIFF format can then be obtained at step 380 for delivery to the destination identifier. Examples of fax servers or fax systems that may be utilized according to embodiments depicted herein are U.S. patent application Ser. No. 13/485,140, entitled "System and Method for Sending, Delivery and Receiving of Faxes," filed May 31, 2012 and U.S. patent application Ser. No. 13/461,351, entitled "System and Method for Sending, Delivery and Receiving of Faxes," filed May 1, 2012, hereby incorporated by reference herein in their entirety.

At step 390, if fax is not the sender's intended delivery method, the delivery method associated with the destination identifier can be determined. The delivery method may have been specified by a recipient in conjunction with the recipients provided destination identifiers, as discussed above. Thus, the delivery method associated with the destination identifier specified by the sender in association with the digital content may be determined. The digital content may be provided to a forwarder associated with the determined delivery method at step 322. This forwarder may be provided in a cloud and be multi-tenanted, could be dedicated to a particular recipient and reside in the cloud, or may be dedicated to a particular recipient and located at a site associated with the recipient.

Figure 3C:
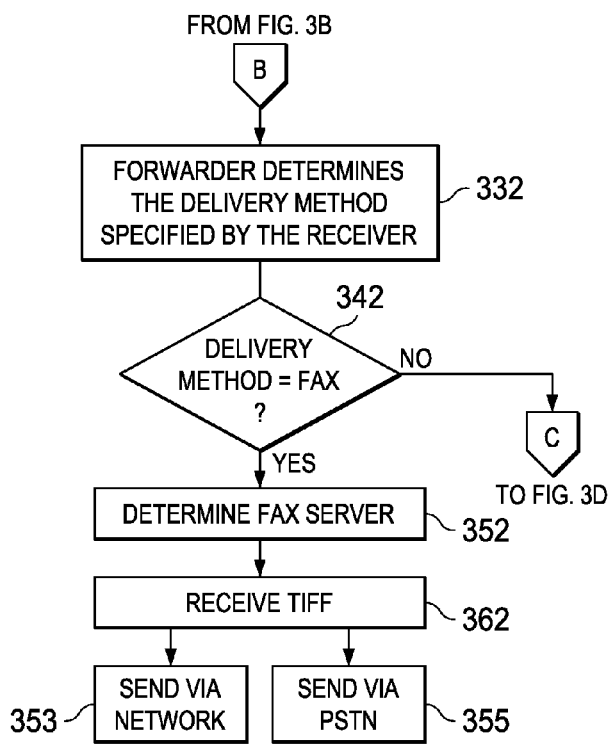

Moving to FIG. 3C, when the forwarder receives the digital content, the forwarder may determine the delivery method associated with the digital content at step 332. In one embodiment, the delivery method may be provided to the forwarder along with the digital content, in another embodiment the forwarder may determine the recipient's specified delivery method substantially as described above.

It can then be determined at step 342 if the recipient's specified delivery method associated with the destination identifier is fax. If the recipient's specified delivery method is fax (and, in one embodiment, if the digital content has not previously been converted to TIFF or was not already in TIFF) the digital content may be converted to the TIFF. This conversion may be accomplished, in one embodiment, by determining a fax server associated with the receiver at step 352 (e.g., which may have been specified in conjunction with the destination identifier). This fax server may be a fax server local to the receiver or may be a hosted fax server. The digital content can then be sent to a fax server associated with recipient which converts it the digital content to TIFF and may send the digital content at step 353 using a fax system over a network such as that discussed in U.S. patent application Ser. No. 13/485,140, entitled "System and Method for Sending, Delivery and Receiving of Faxes," filed May 31, 2012 and U.S. patent application Ser. No. 13/461,351, entitled "System and Method for Sending, Delivery and Receiving of Faxes," filed May 1, 2012, hereby incorporated herein by reference in their entirety. Alternatively, the digital content may be sent to the destination identifier over the PSTN at step 355 using, for example, a cloud based system for sending faxes over the PSTN.

Figures 3D, 3E:
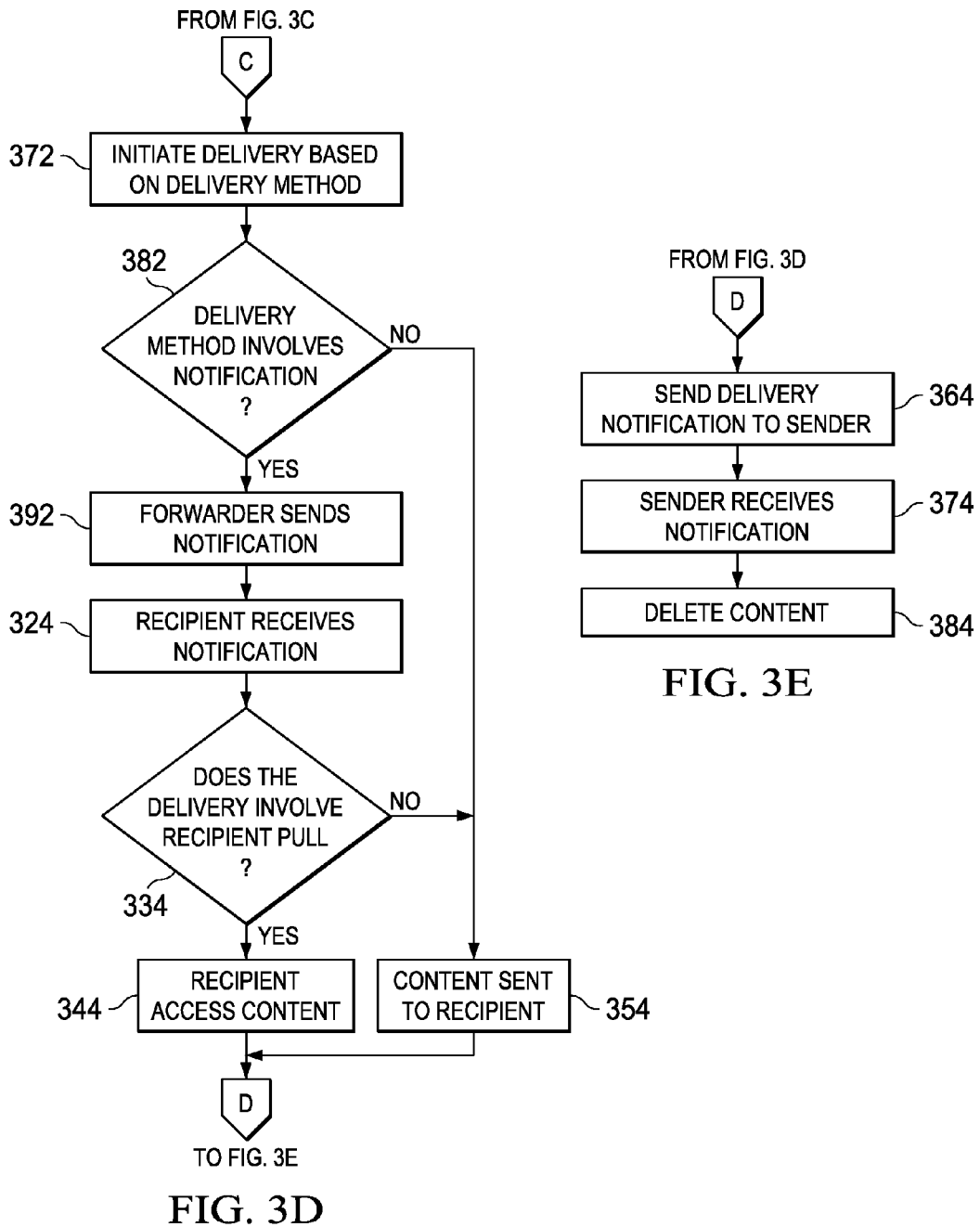

Referring now to FIG. 3D, delivery of the digital content to the recipient may then be initiated at step 372 based on the recipient's specified delivery method. At step 382 it can be determined if the recipient's specified delivery method involves notification to the recipient and a notification destination (which may be the same as, or different than, the delivery destination) associated with the delivery method may be determined.

If notification is involved, the forwarder may send a notification to the notification destination at step 392 and a recipient may receive such a notification at step 324. For example, in certain embodiments an email may be sent to provide notification to the recipient that digital content is available. For example, in cases where the destination identifier denotes a URL a push notification with an identifier for the content may be sent to the URL to identify that content is available.

If the recipient's specified delivery method requires that the recipient pull the or otherwise manually access the content at step 334 (e.g., using a website or an API, as discussed above) the recipient may access the content at step 344. In one embodiment, the user may log onto or access the web site or other application and download the digital content. This access may be facilitated by the user through the format of the notification. For example, as discussed above the notification (e.g., email) itself may be used to access the website or application through which the content may be provided. In another embodiment, the digital content may be accessed, for example, by the recipient using an API and an identifier for the digital content provided in a notification. This embodiment may be useful in instances when the recipient is an application as the application may be configured to access such digital content using the API substantially without user involvement. Accordingly, any workflows or processing dependent on the receipt of such content may not be suspended or otherwise idled longer than necessary when waiting for such digital content.

Returning to step 382, if the recipient's specified delivery method does not involve a notification the content may be sent to a recipient at a specified delivery destination at step 354 using an appropriate delivery method (e.g., sending the digital content via HTTP to a network location specified by the recipient as the delivery destination in association with the destination identifier provided by the sender, sending an email (that may be encrypted) to an email address specified as the delivery destination, sending a fax to a telephone number specified as the delivery destination, etc.). The digital content may then be integrated directly into the recipient's system (e.g., an SAP application, a SharePoint library, etc.) where appropriate or otherwise utilized as desired.

Moving on to FIG. 3E, once the digital content is delivered then, a notification of delivery of this digital content may be sent to the original sender at step 364. The sender may receive such a notification at step 374 and the content deleted from the content delivery system at step 384. To ensure security, it may be the case that digital content on the content delivery system may be deleted after a certain period of time (e.g., 30 days, 60 days, 90 days, etc.) even if the delivery or access of such content is never confirmed or never actually takes place. Additionally, in certain embodiments, the original sender of such digital content may also delete content. It will be noted that while this step is depicted after the digital content is sent to the recipient, in certain embodiments the digital content may be deleted before the sending of such digital content (e.g., if the sender no longer desires to send such digital content, etc.).

Figure 4:
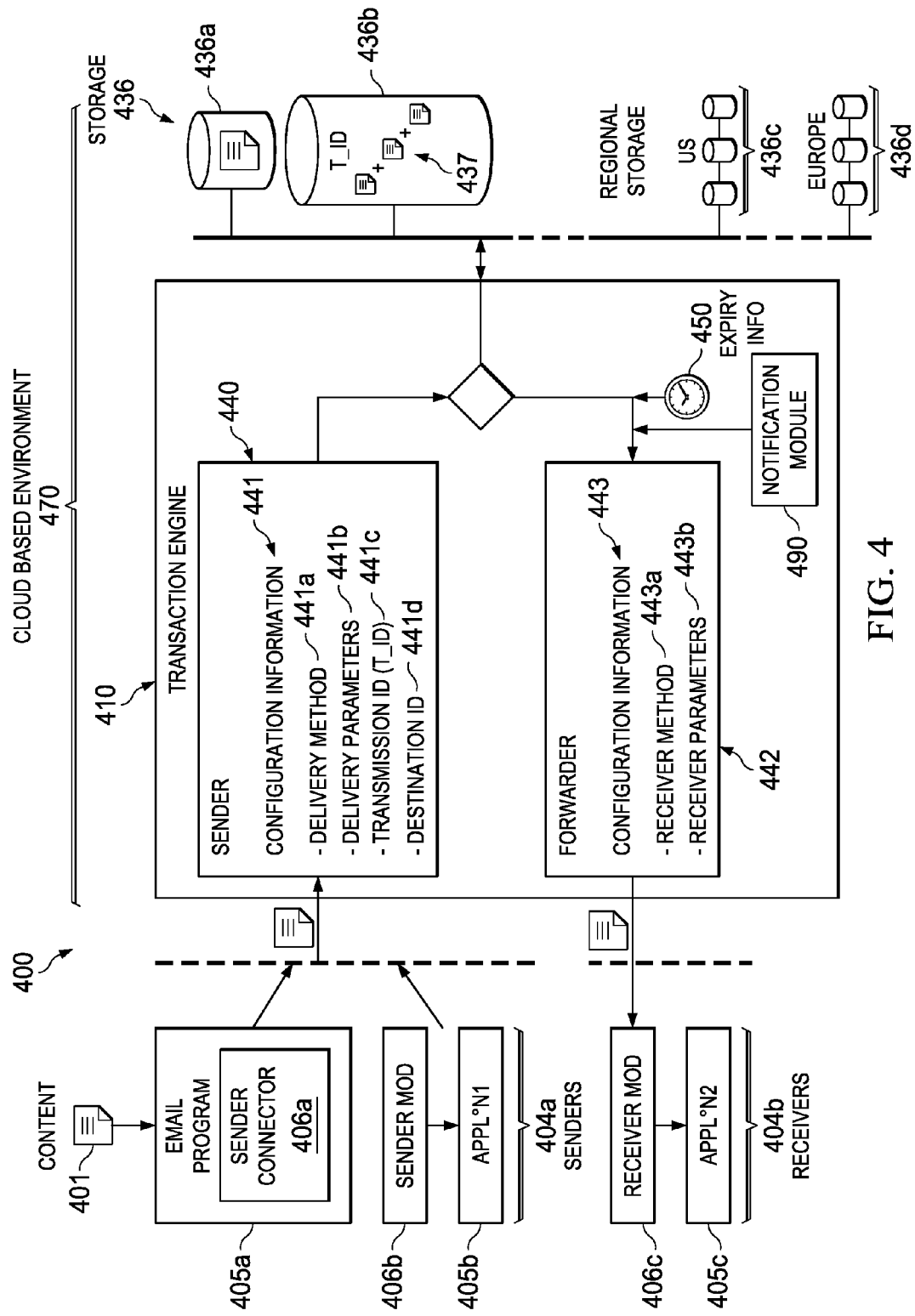
FIG. 4 depicts one embodiment of a transaction system.

It may now be helpful here to discuss other embodiments of systems for content delivery. Accordingly, FIG. 4 depicts one embodiment of an architecture of a transactional system 400 that may be used for content delivery where services associated with content delivery are deployed in a cloud-based computing environment 470. Here, transactional system 400 includes a transaction engine 410 for sending and receiving content (generally denoted by reference numeral 401) and executing on a server. Transaction engine 410 includes sender 440 for receiving content 401 from a sender (generally denoted by reference numeral 404*a*) using a sender device (as may the same or similar to devices 104*a*, 104*b*, 104*c* described in conjunction with FIG. 1) and sender configuration information 441. Transaction engine 410 further includes a forwarder 442 for sending the content 401 to a recipient (generally denoted by reference numeral 404*b*) on a recipient device (as may be the same or similar to devices 104*d*, 104*e*, 104*f* described in conjunction with FIG. 1), recipient configuration information 443, and a storage device 436 coupled to the transaction engine 410 for storing the content 401.

In a further embodiment, sender configuration information 441 includes information related to a delivery method 441*a* for delivery of the content 401 to the transaction engine 410 via the sender device, delivery parameters 441*b* to control content delivery, and a destination identifier 441*c* denoting a receipt address for a recipient 404*b*. The sender configuration information can be defined by the sender 404*a* and received via the sender device. In such embodiments, the sender 404*a* can use a sender connector 406*a* resident on the sender device to define the sender configuration information 441. The sender connector 406*a* can be a plug-in to an application, such as an email program or a standalone module in communication with an application (an example of which is denoted on FIG. 4 as APPL'N1).

In some embodiments, delivery method 441*a* can include an email protocol, hypertext transfer protocol, and/or a delivery method of a particular application such as those describes herein above with reference to FIG. 1. Destination identifier 441*d* can include an email address, a uniform resource locator (URL), and other destination identifiers described herein above in conjunction with FIG. 1. Delivery parameters 441*b* include a variety of parameters useful to effectively and purposefully control the delivery of content 401, such as encryption information, content type and size information, information for packets and sub-packets including pieces of the content 401, content format, sender credentials, certain application and/or contextual requirements for content transactions, such as content classifications, access permissions, expiry information, regional information, etc.

In another embodiment, recipient configuration information 443 includes information related to a receiver method 443a for delivery of the content 401 from the transaction engine 410 to a recipient device, and receiver parameters 443b to further control content delivery. In such embodiments, the recipient 404b can use a receiver module 406c resident on the recipient device to define the recipient configuration information 443. Much like the sender connector 406a, 406b, the receiver module 406c can be a plug-in to an application or a standalone module in communication with an application (an example of which is denoted on FIG. 4 as APPL'N2).

In some embodiments, receiver method 443a can include a method of content delivery expected by an application 405c. As such, the receiver method 443a can include an email protocol for an email program, hypertext transfer protocol for an Internet browser, and/or a receiver method of a particular vendor application such as those described herein above with reference to FIG. 1. Receiver parameters 443b can include a variety of parameters useful to effectively and purposefully control how a recipient receives (and/or expects to receive) content 401, many of which can mirror the delivery parameters 441b. Receiver parameters 443b can include content type, regional storage information, validation information to validate the content, integration information for integrating and packaging the content for the recipient, and security information.

In some embodiments, transactional system 400 is deployed in a cloud-based computing environment 470 including a plurality of distributed network servers. Here, the servers can be under the control of a service entity enabling use of the transactional system 400 by applications, other systems, and/or users. The service entity can configure content transaction information (such as sender configuration information 441 and/or recipient configuration information 443) and setup and maintain servers as needed to handle one or more clients. As such, transactional system 400 (its users and clients) can realize the benefits of cloud-based computing environments.

In further embodiments, storage device 436 includes at least one storage device located in a predetermined geographic region. For example, one or more storage devices 436c can be located in the United States and/or one or more other storage devices 436d can be located in Europe. This enables content storage requirements to follow certain requirements and guidelines, such as those promulgated by the United States Department of Homeland Security (DHS). The DHS may require, for example, that certain content 401 of a particularly sensitive nature be stored in a preordained location, such as a secure server within the boundaries of the United States. As such, the predetermined geographic region can be configured by sender 404a, a transaction engine administrator, and/or a recipient 404b as needed or desired.

Further to the above, the predetermined location may be based on the data sovereignty requirements of a particular country or region, such as the European Union. In such instances, content for European users may be stored on storage devices located in Europe. In other instances involving clients in the United States, content may be stored in the United States where it is accessible according to the laws of the United States, such as the Patriot Act.

In other embodiments, sender configuration information 441 further includes a transmission identifier 441c, which can be a unique identifier associated with the content 401. In still further embodiment, the content 401 is stored as a plurality of storage pieces (generally denoted by reference numeral 437) on the storage device 436b. The storage pieces 437 are associated with the transmission identifier 441c (referred to as T_ID in FIG. 4). This can enable the transaction engine 410 to identify separate pieces of content 401 with a single transmission to forward to recipients.

In some embodiments, transaction engine 410 further includes a notification module 490 for configuring notifications to at least one of the sender 404a and the recipient 404b. Such notifications can include those described with reference to FIGS. 3A-3E.

It should be noted that in some embodiments of the transactional system 400, the transaction engine 410 sends/receives content 401 from sender 404a to recipient 404b either of whom at least partially defines the configuration information. However, the transaction engine 410 can also be configured to enable content transactions between different applications, such as an email program and a content server without any user intervention. In such instances, the applications may be preconfigured with respective sender configuration information 441 and recipient configuration information 443 to automatically enable content transactions. Advantageously, the transaction engine 410 can be configured to handle content using methods and formats appropriate for such applications. For example, the transaction engine 410 can be configured to receive content 401 in a manner a particular application expects to send content 401 and send the content 401 in a manner another particular application expects to receive the content 401. This can enhance and facilitate content transactions across different applications and systems (with different users and/or user groups) and can also reduce complexity, setup time and maintenance and increase flexibility and transparency.

In a further embodiment, the transaction engine 410 is configured to delete the content 401 on the storage device 436 based on the elapse of a predetermined amount of time the content 401 is stored on the storage device 436. Such expiry information 450, much like the predetermined geographic region described herein above, can be based on security requirements of the content 401. For example, security requirements can dictate that content 401 not be stored on storage device 436 for more than a predetermined amount of time. Such a requirement may reduce security risks associated with content 401 by limiting the amount of time content 401 is stored on security device 436 where it may be compromised by hackers or thieves.

Figure 5:
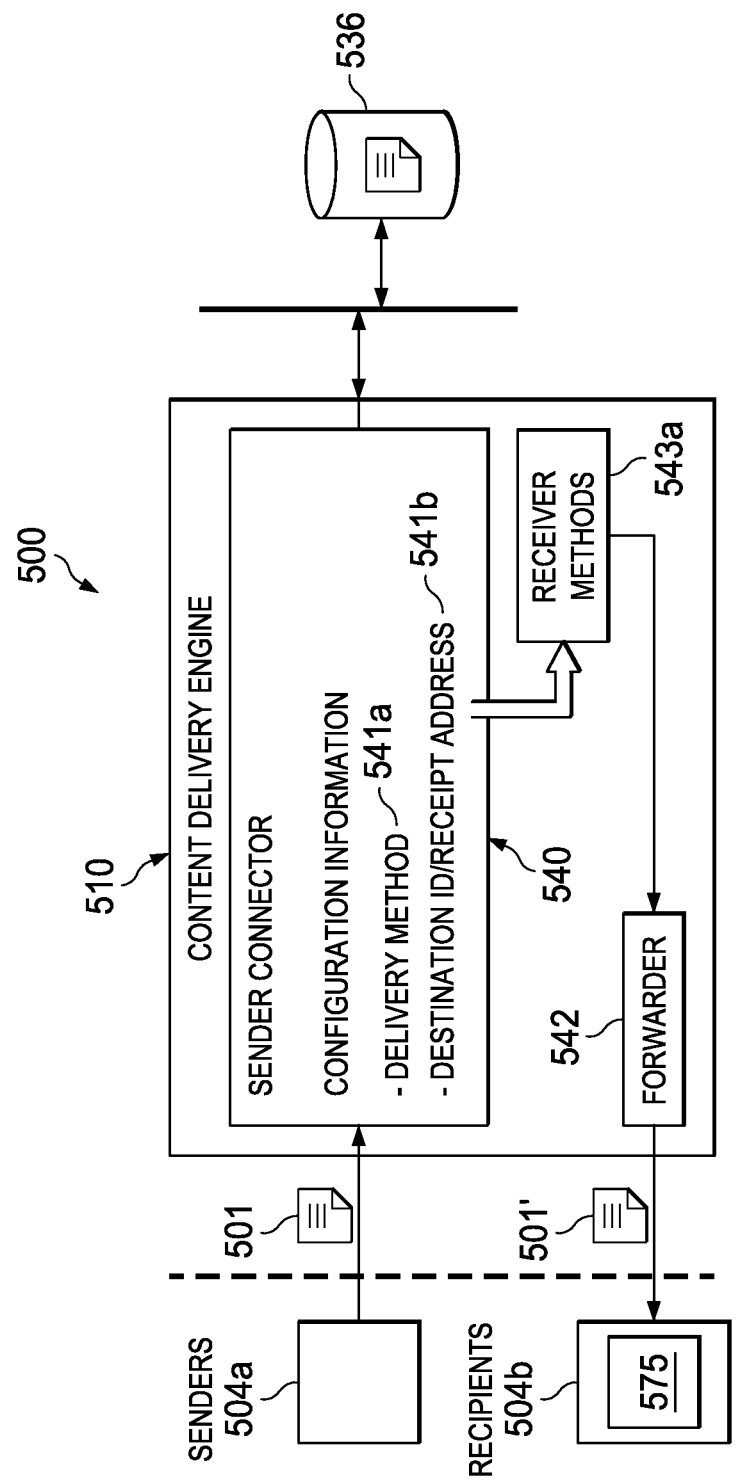
FIG. 5 depicts one embodiment of a transaction system.

Referring now to FIG. 5, in a further embodiment, a content delivery system 500 (which may include components of the transactional system 400 described in conjunction with FIG. 4) includes a content delivery engine 510 for sending and receiving content 501 and executing on a server. The content delivery engine 510 includes a sender connector 540 for receiving content 501 from a sender device (generally denoted by reference numeral 504a) and sender configuration information including a delivery method 541a for delivery of the content 501 to the content delivery engine 510. The sender configuration information can also include a destination identifier 542b denoting a receipt address for a recipient.

The content delivery engine 510 further includes a forwarder 542 for sending the content 501 to the recipient, recipient configuration information including a receiver method 543a for delivery of the content 501 from the content delivery engine 510 to a recipient device (generally denoted by reference numeral 504*b*), and a storage device 536 coupled to the content delivery engine 510 for storing the content 501.

The delivery method 543*a* can include a method of delivery accepted or expected by an application 575 and/or desired by a user on the recipient device 504*b*. For example, the delivery method 543*a* can include methods utilized by a content integration systems such as those manufactured by SAP Corporation or Microsoft Corporation such as Microsoft Sharepoint. The delivery method 543*b* may include configuration information such as content type, regional storage information, and/or encryption information for encrypting/decrypting the content 501 for secure delivery.

The content delivery engine 510 maps the receipt address 541*b* to a receiver method 543*a* based on the needs and requirements of a user and/or application 575 executing on the recipient device 504*b*. For example, the application 575 may include a workflow application and the receiver method 543*a* may include information for updating, modifying, and/or packaging the content 501' for automatic ingestion into the workflow application. The forwarder 542 sends the content 501' to the recipient device 504*b* according to the mapped receiver method. In some embodiments, the receiver method 543*a* includes a plurality of receiver methods, at least a portion of which are predefined according to a suite of applications. The receipt addresses for a group of applications may be pre-mapped to receiver methods (and stored in a table) to enable automatic ingestion of the content 501' into a particular application.

In some embodiments, an administrator defines, updates, and maintains receipt address-receiver method mappings and such mappings can be stored in a variety of formats. For example, the mappings can be arranged in a database table accessible to the administrator. In the same or different embodiment, senders, recipients, or a combination thereof can define at least a portion of the mappings.

In further embodiments of the content delivery system 500, the delivery methods are mapped to a sender address to enable the content delivery engine 510 to receive content 501 in a manner utilized by the sender device 504*a*. The delivery methods may be predefined according to a suite of applications so that the content deliver system 500 can accept content 501 in the appropriate format without any need to specify certain content information for each delivery.

Figure 6:
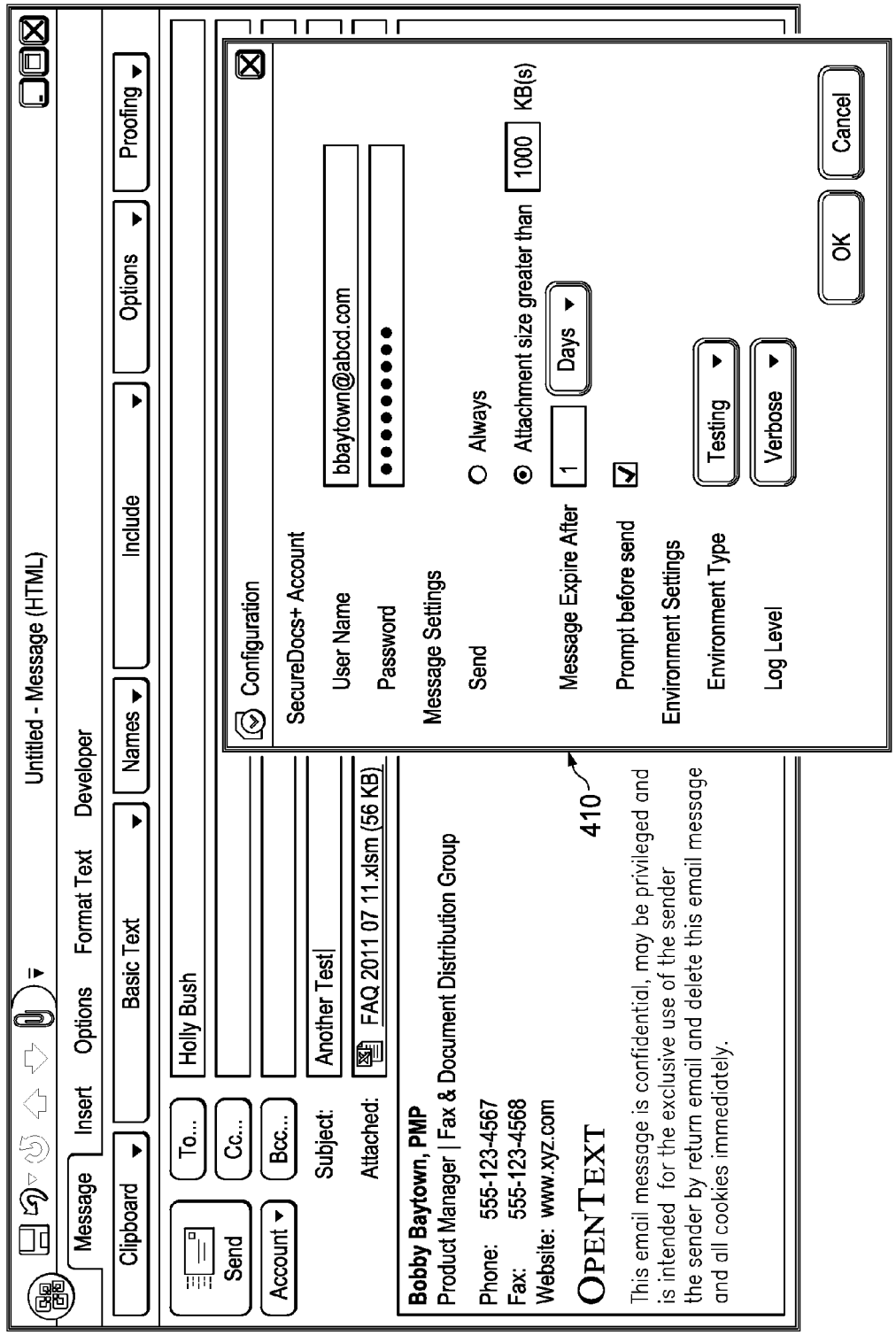
FIG. 6 depicts one embodiment of an interface.

It may be useful to an understanding of certain embodiments to view embodiments of interfaces that may be utilized with embodiments of a content delivery system or a transactional system as disclosed herein. Turning first to FIG. 6, an embodiment of an interface that may be presented by a sending connector integrated in an email application is depicted. Here, while sending an email, to send an email a sending use may configure a sending connector for a content delivery system such that the portion 410 of the interface presented is associated with a sending connector for sending the digital content of the email (e.g., the attachment to the email) using a content delivery system associated with the sending connector. Additionally, here, the interface 410 allows the user to configure the sending connector according to the user's preferences.

Figure 7:
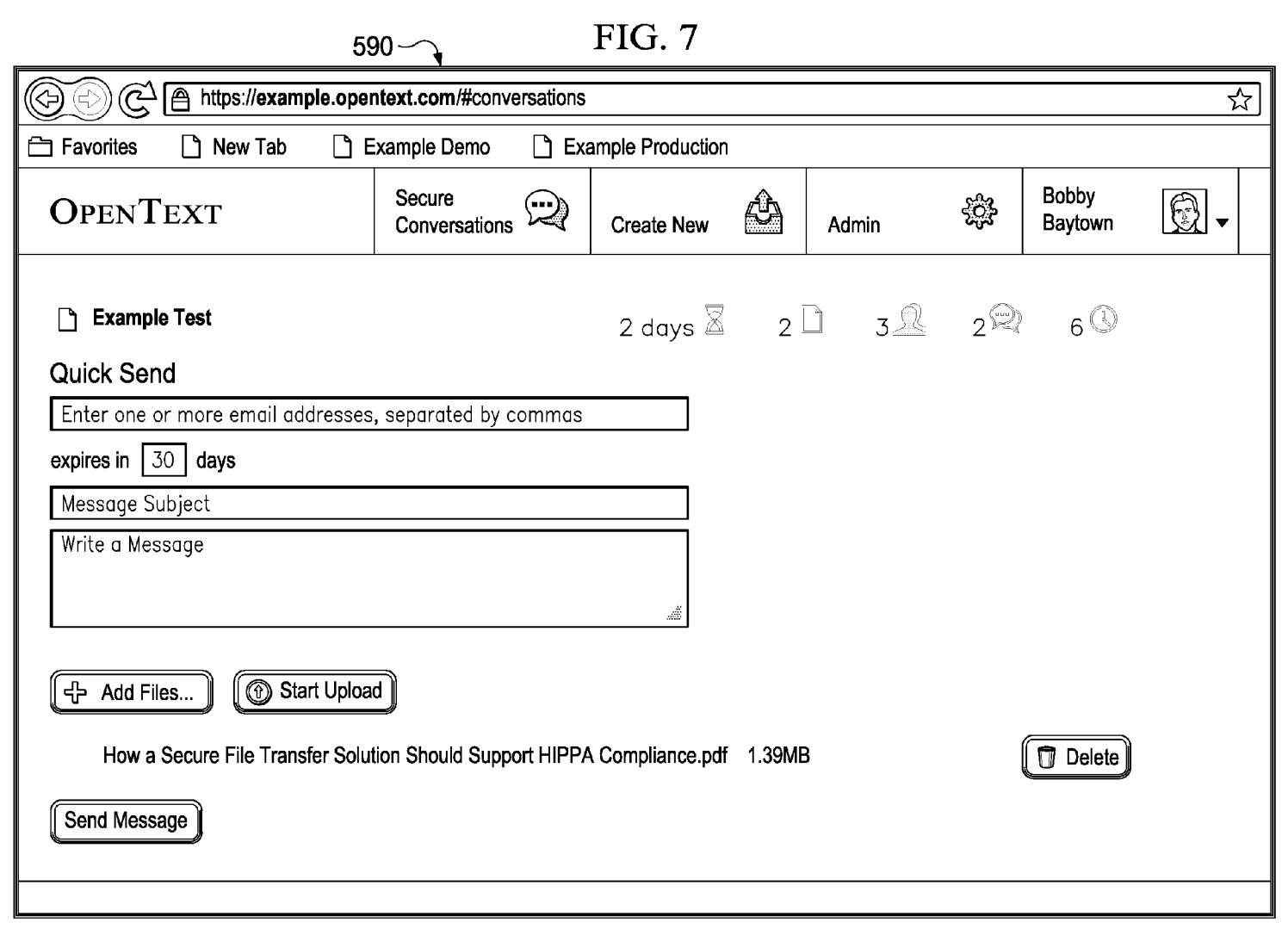

FIG. 7 depicts an embodiment of an interface that includes a sending connector for a content delivery system. Specifically, here, interface 590 may be a web page rendered by a browser where the web page presents an interface that allow a one or more destination identifiers to be specified and digital content to be selected (e.g., from a system on which the web page is being rendered). Such a web page may include a sending connector such that the destination identifier and digital content specified through the interface 590 may be received by the sending connector.

Figure 8:
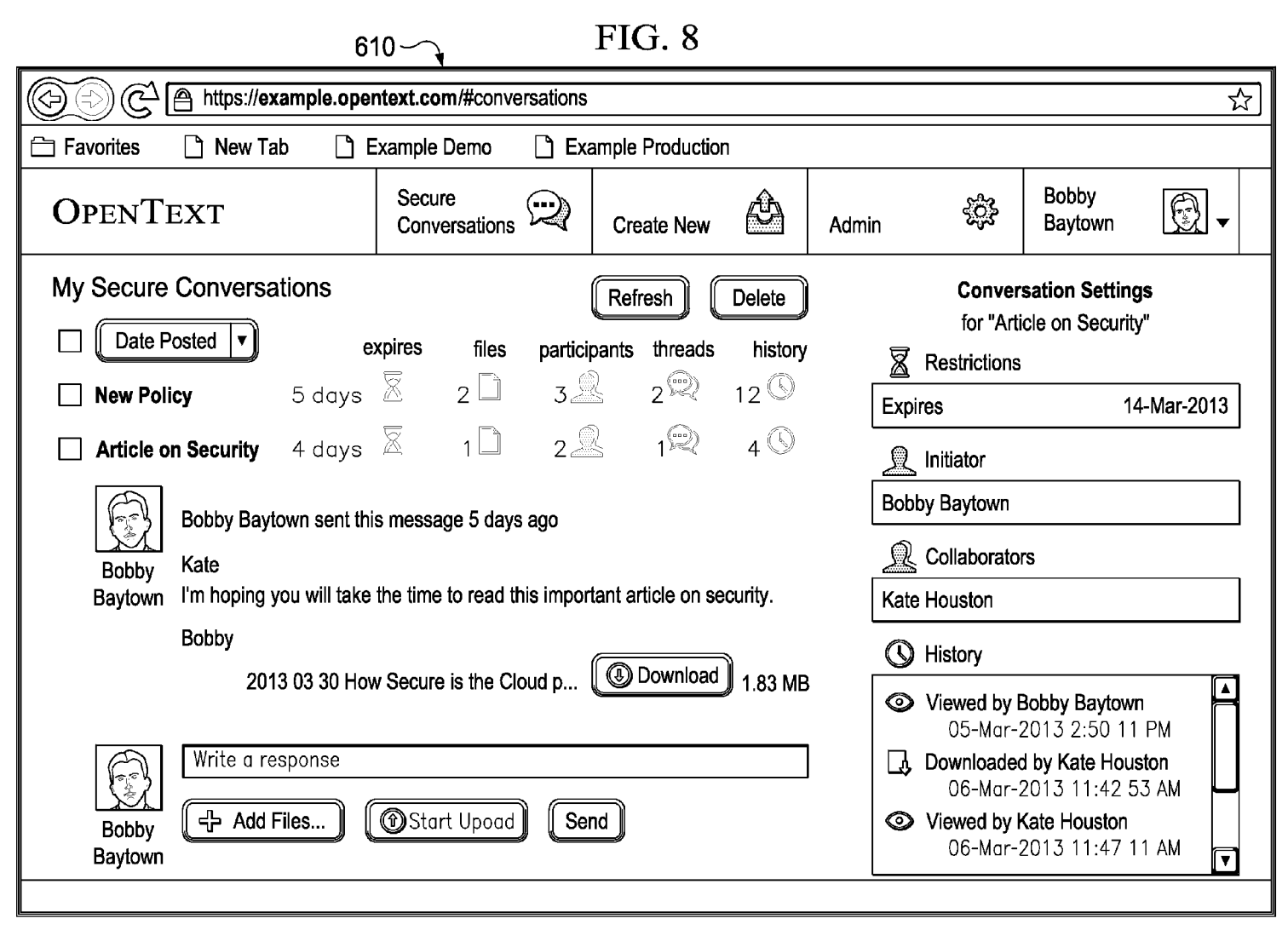

FIG. 8 depicts an embodiment of another interface that includes a sending connector for a content delivery system. In this embodiment, interface 610 may be a web page rendered by a browser where the web page presents an interface that allow a conversation between one or more users to be depicted. Such a conversation may be associated with destination identifiers for each participant such that each participant in the conversation may use such an interface to select digital (e.g., from a participant's system on which the web page is being rendered) and associated with the destination identifiers of participants in the conversation. Such a web page may include a sending connector such that the destination identifier and digital content specified through the interface 610 may be received by the sending connector.

Figure 9:
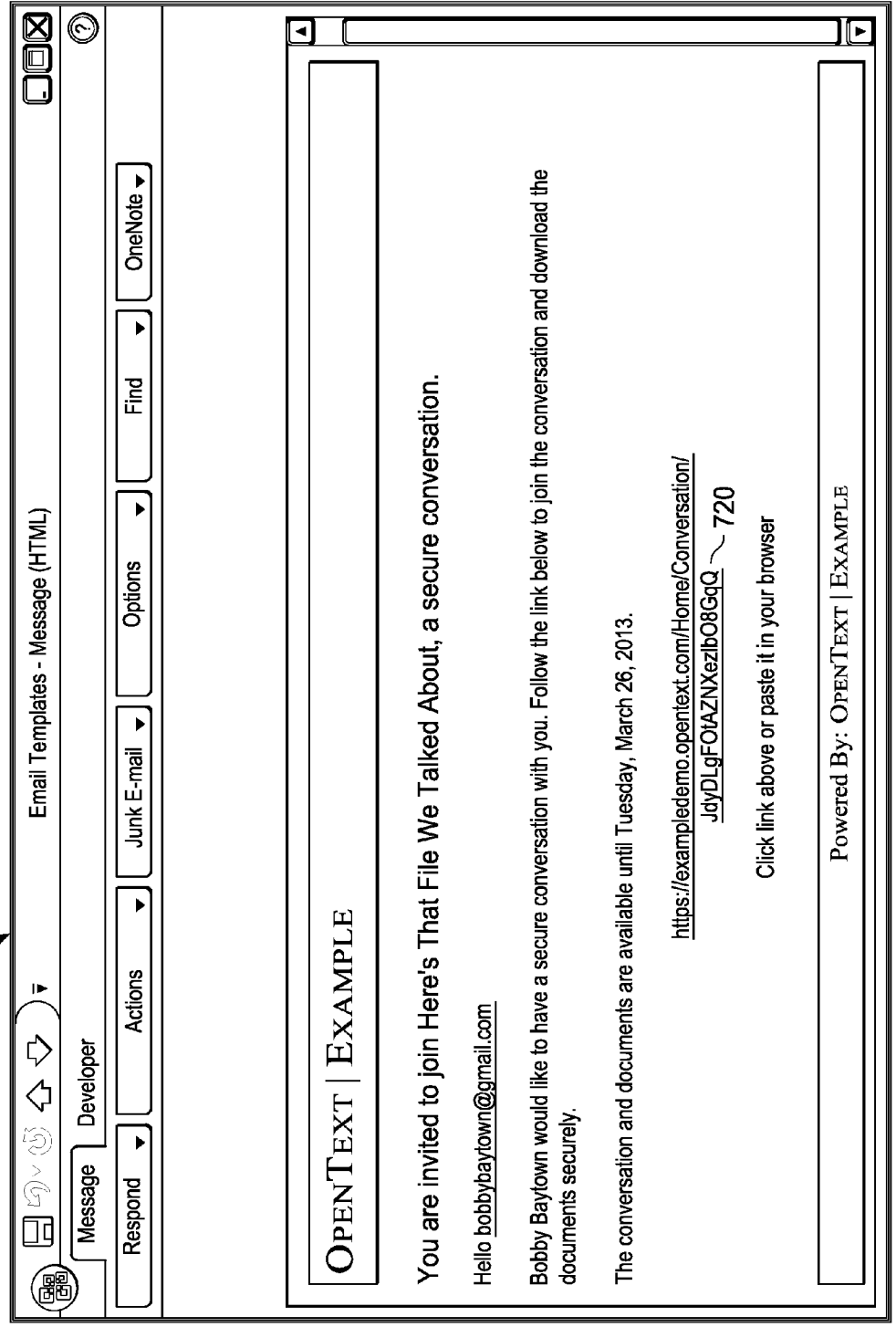
FIG. 9 depicts one embodiment of an interface.

Moving to FIG. 9, an embodiment of an interface for a notification that may be sent by a content delivery system to a recipient is depicted. Here, interface 710 is an email that has been sent to the recipient that includes a link 720 identifying digital content by which the recipient may access the digital content. Specifically, interface 710 is an email that may be received by a participant in the conversation depicted in the interface of FIG. 8. When such a participant clicks on the link the web page associated with that conversation may be accessed by a browser at the recipient's system. The recipient may be authenticated by that web page and allowed to download the digital content. Thus, notification was provided interface 710 but digital content was accessed through the web page referenced in the notification.

Figure 10:
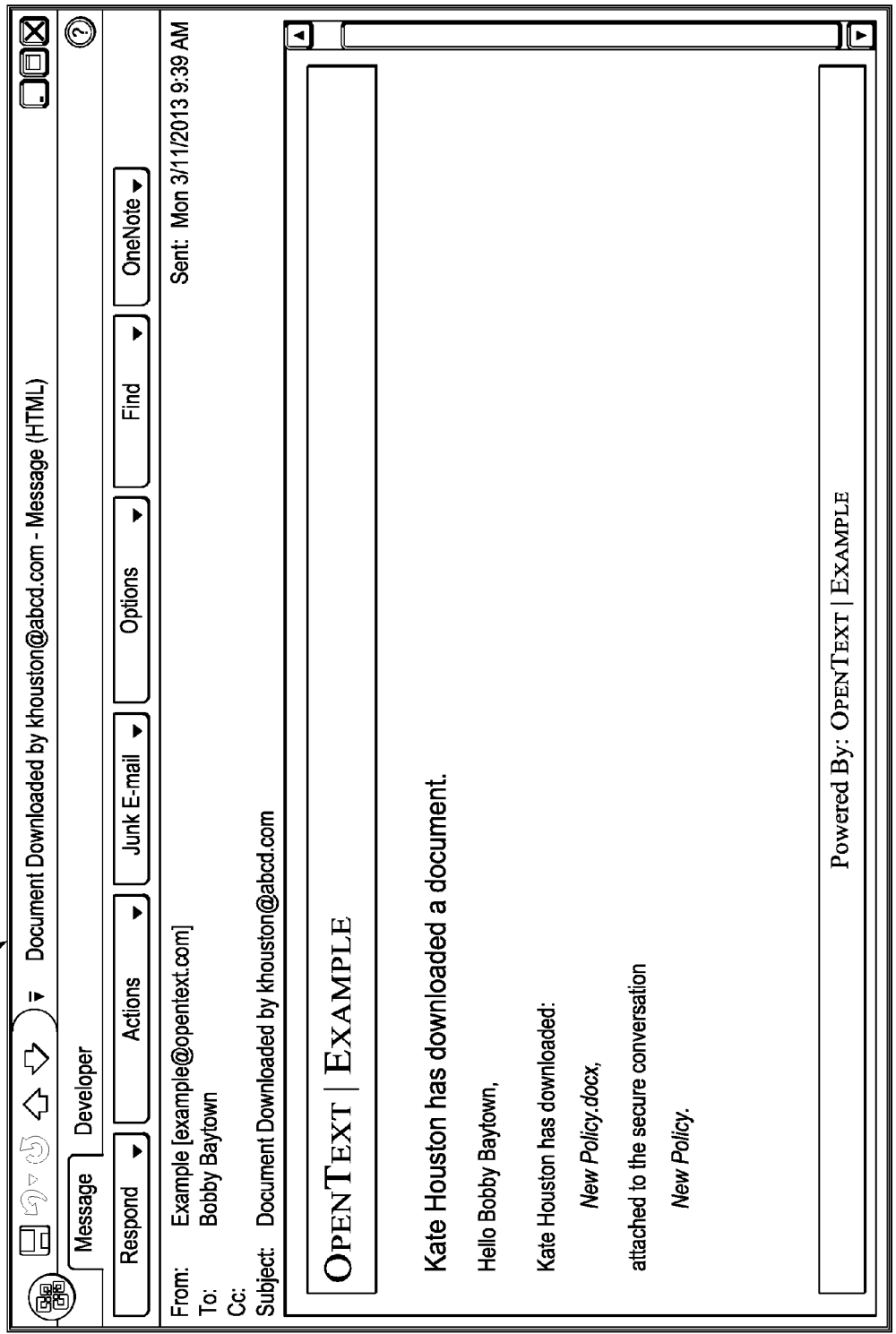
FIG. 10 depicts one embodiment of an interface.

Referring now to FIG. 10, an embodiment of an interface for a notification that may be sent by a content delivery system to a sender of digital content when such content is delivered is depicted. Here, interface 810 is an email that has been sent to the sender of content that identifies the recipient and the digital content which has been delivered to that recipient. Specifically, interface 810 is an email that may be received by a participant in the conversation depicted in the interface of FIG. 8 who sent content to another participant. When the participant who was the recipient accessed the sent content the content delivery system sent an email to the sending participant that notifies the sending participant that the digital content was accessed, the recipient participant who accessed the content and, in this example, the conversation. Thus, delivery notification was provided through email interface 810 but digital content was sent and through a web page provided by the content delivery system.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function.

While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for delivering content, comprising:
   a processor;
   a computer readable memory, comprising instructions for:
   a sender module for executing on the processor in a cloud based computing environment to:
      receive content from a sending connector at a sending device, wherein the sending connector is a plug-in of an application, the content is associated with a first destination identifier associated with a first delivery method,
      a transmission initiator of the content has sent the content to the first destination identifier according to the first delivery method,
      and the first destination identifier identifies a destination according to the first delivery method;
   and a forwarder module for executing on the processor in the cloud based computing environment to:
      determine a second destination identifier and a second delivery method associated with the first destination identifier, without further involvement of the transmission initiator in the determination;
      and deliver the content to the second destination identifier according to the second delivery method by providing a location from which the content may be accessed and sending the location to the second destination identifier;
   and a remote content access module configured to allow a user to access the content at the location.

2. The system of claim 1, wherein the second destination identifier is the same as the first destination identifier.

3. The system of claim 1, wherein the second delivery method is the same as the first delivery method.

4. A transactional system, comprising:
   a transaction engine for sending and receiving content and executing on a server, comprising:
      a sender connector for receiving content from a sender device, wherein a transmission initiator of the content has sent the content to a destination identifier according to a delivery method;
      sender configuration information including:
         at least one delivery method for delivery of the content to the transaction engine;
         a plurality of delivery parameters to control content delivery;
         and the destination identifier denoting a receipt address for a recipient according to the delivery method;
      a forwarder for sending the content to the recipient, without further involvement of the transmission initiator in the forwarding;
      recipient configuration information including:
         at least one receiver method for delivery of the content from the transaction engine to a recipient device;
         and a plurality of receiver parameters to further control content delivery;
      and a storage device for storing the content, the storage device in a predetermined geographic region and coupled to the transaction engine, wherein the predetermined geographic region is configured by a sender, a transaction engine administrator, or a recipient.

5. The transactional system of claim 4, wherein the sender configuration information is defined by a sender and received via the sender device.

6. The transactional system of claim 4, wherein the delivery parameters include at least one of: content type, regional storage information, validation information to validate the content, integration information for integrating the content for the recipient, and security information.

7. The transactional system of claim 4, wherein the forwarder configuration information is defined by a recipient and received via the recipient device.

8. The transactional system of claim 4, wherein the forwarder parameters include at least one of: content type, regional storage information, validation information to validate the content, integration information for integrating the content for the recipient, and security information.

9. The transactional system of claim 4, wherein the server is a plurality of distributed network servers, the servers under the control of a service entity enabling use of the transaction engine by a sender and a recipient over a network to send and receive the content.

10. The transactional system of claim 4, wherein the predetermined geographic region is based on security parameters for the content.

11. The transactional system of claim 4, wherein the sender configuration information further includes a transmission identifier, the content is stored as a plurality of storage pieces on the storage device, and the storage pieces are associated with the transmission identifier.

12. The transactional system of claim 4, wherein the transaction engine further comprises a notification module for configuring notifications to at least one of a sender and a recipient.

13. The transactional system of claim 4, wherein the transaction engine is configured to delete the content on the storage device based on the elapse of a predetermined amount of time the content is stored on the storage device.

14. A content delivery system, comprising:
   a content delivery engine for sending and receiving content and executing on a server, comprising:
      a sender connector for receiving content from a sender device, wherein a transmission initiator of the content has sent the content to a destination identifier according to a delivery method;
      sender configuration information including:
         at least one delivery method for delivery of the content to the content delivery engine;
         and the destination identifier denoting a receipt address for a recipient according to the delivery method;
      a forwarder for sending the content to a recipient, without further involvement of the transmission initiator in the forwarding;
      recipient configuration information including:
         at least one receiver method for delivery of the content from the content deliver engine to a recipient device;

and a storage device for storing the content, the storage device in a predetermined geographic region and coupled to the transaction engine, wherein the predetermined geographic region is configured by a sender, a transaction engine administrator, or a recipient, wherein the content delivery engine maps the receipt address to the at least one receiver method, the receiver method including information for integrating the content into an application executing on the recipient device, the forwarder sending the content according to the mapped receiver method.

15. The system of claim 1, wherein the content is delivered with associated metadata.

16. The system of claim 1, wherein the forwarder module executes to delete the content after the expiration of a time period.

17. The system of claim 1, wherein the content includes content from an email client, SharePoint, an Oracle application, an SAP application, Lotus Notes, a fax machine, a web page, or an enterprise resource planning (ERP) system.

18. The system of claim 1, wherein the location includes a Uniform Resource Locator (URL).

19. The system of claim 18, wherein the location is provided by sending an email.

* * * * *

UNITED STATES PATENT AND TRADEMARK OFFICE
CERTIFICATE OF CORRECTION

PATENT NO. : 9,699,127 B2
APPLICATION NO. : 13/927023
DATED : July 4, 2017
INVENTOR(S) : Brian Lennstrom et al.

Page 1 of 1

It is certified that error appears in the above-identified patent and that said Letters Patent is hereby corrected as shown below:

In the Claims

In Column 30, Line 3, Claim 4, delete "storing the content" and insert --storing content--.

Signed and Sealed this
Second Day of January, 2018

Joseph Matal
*Performing the Functions and Duties of the*
*Under Secretary of Commerce for Intellectual Property and*
*Director of the United States Patent and Trademark Office*